(12) United States Patent
Wadle et al.

(10) Patent No.: US 7,667,340 B2
(45) Date of Patent: *Feb. 23, 2010

(54) POWER FROM A NON-ANIMAL ORGANISM

(75) Inventors: Gordon W. Wadle, Thomson, IL (US); Kris J. Lagadinos, Brookline, MA (US)

(73) Assignee: WHLK, LLC, Canton, MA (US)

( * ) Notice: Subject to any disclaimer, the term of this patent is extended or adjusted under 35 U.S.C. 154(b) by 490 days.

This patent is subject to a terminal disclaimer.

(21) Appl. No.: 11/622,713

(22) Filed: Jan. 12, 2007

(65) Prior Publication Data

US 2007/0279014 A1 Dec. 6, 2007

Related U.S. Application Data

(63) Continuation-in-part of application No. 11/302,709, filed on Dec. 13, 2005, now Pat. No. 7,466,032.

(60) Provisional application No. 60/758,847, filed on Jan. 13, 2006, provisional application No. 60/761,822, filed on Jan. 24, 2006, provisional application No. 60/784,537, filed on Mar. 21, 2006, provisional application No. 60/803,059, filed on May 24, 2006, provisional application No. 60/805,676, filed on Jun. 23, 2006.

(51) Int. Cl.
*H05F 7/00* (2006.01)

(52) U.S. Cl. ........................ 290/1 R; 290/1 A

(58) Field of Classification Search ................ 290/1 R, 290/1 A; 322/2 A
See application file for complete search history.

(56) References Cited

U.S. PATENT DOCUMENTS

| | | | |
|---|---|---|---|
| 3,822,505 A | 7/1974 | Levengood | 47/1.3 |
| 4,177,603 A | 12/1979 | Dykes | 47/1.3 |
| 5,052,628 A | 10/1991 | Wainwright et al. | 239/690 |
| 5,288,626 A | 2/1994 | Levengood | 435/172.3 |
| 6,473,641 B1 | 10/2002 | Kodama et al. | 600/547 |

(Continued)

FOREIGN PATENT DOCUMENTS

EP 0 039 163 A1 11/1981

(Continued)

OTHER PUBLICATIONS

Mahler, P. *Nature's Electricity*, Tree of Knowledge (Hog Kong) Ltd., Scientific Experiment Kits, pp. 1-20 (2003).

(Continued)

*Primary Examiner*—Nicholas Ponomarenko
(74) *Attorney, Agent, or Firm*—Wolf, Greenfield & Sacks, P.C.

(57) ABSTRACT

A method for drawing electricity from a non-animal organism, the method including coupling a first electrical conductor to the non-animal organism, coupling a second electrical conductor to a ground rod, embedding the ground rod into soil at a predetermined depth as a function of a desired current level, whereby the current available from the non-animal organism is increased by increasing the depth that the ground rod is embedded into the soil, coupling an electrical load between the first electrical conductor and the second electrical conductor, the electrical load being configured to draw electricity from the non-animal organism via the first electrical conductor, and operating the electrical load using electricity drawn from the non-animal organism.

8 Claims, 8 Drawing Sheets

U.S. PATENT DOCUMENTS

| | | | | |
|---|---|---|---|---|
| 7,161,362 | B2 | 1/2007 | Shambroom et al. | 324/692 |
| 7,466,032 | B2* | 12/2008 | Wadle et al. | 290/1 R |
| 2003/0150156 | A1 | 8/2003 | Flagler et al. | 47/1.3 |

FOREIGN PATENT DOCUMENTS

| | | |
|---|---|---|
| EP | 0 459 540 A1 | 12/1991 |
| JP | 11-47279 | 2/1999 |
| JP | 2001-87241 | 4/2001 |
| JP | 2003-284697 | 10/2003 |
| WO | WO 2005/065544 A1 | 7/2005 |

OTHER PUBLICATIONS

Nelson, R. *Hemp Husbadry*, Internet Edition, Chapter 5, Electro-Culture (2000), http://www.rexresearch.com/hhusb/hh5elc.htm.

Scientifics, 1977 Annual Science Reference Catalog, C971A, Edmund Scientific Co., Barrington, NJ, p. 71, "Potato Power—The Clock Idea of the Tear".

Bateman, M., "Camex-3 Lightning Instrument Package (LIP)", 2005, http://ghrc.msfc.nasa.gov/uso/readme/er2lip.html, 5 pages.

Blakeslee, R., "Camex-3 Instruments", Camex-3 Lightning Instrument Package (LIP), 2001, http://ghrc.msfe.nasa.gov/camex3/instruments/lip.html, 3 pages.

Campbell, J., "Electric Filed Mill Fabrication", 2001, http://www.precisionstrobe.com/jc/fieldmill/fieldmill.html, 5 pages.

"Electric Filed Mills", 1999, http://www.aero.org/publications/crosslink/summer2001/05_sidebar3.html, one page.

Chun et al., "Microfluidic analysis of electrokinetic streaming potential induced by microflows of monovalent electrolyte solution", *J. Micromech. Microeng.*, 15:710-719 (2005).

Garrido, J., "Observable streaming potential in membranes", *J. Electrochem. Soc.*, 150(11):E567-E570 (2003).

Koppán et al., "Measurement of electric potential difference on trees", *Proceedings of the 7th Hungarian Congress on Plant Physiology*, 46(3-4):37-38 (2002).

Science Service, Intel STS Results, "59th Annual STS (1999-2000) Finalists—Brian David Hemond", http://www.sciserv.org/sts/59sts/Hemond.asp, one page. (Jan. 3, 2007).

Yang et al., "Electrokinetic microchannel battery by means of electrokinetic and microfluidic phenomena", *J. Micromech. Microeng.*, 13:963-970 (2003).

Fensom, D.S., "The Bioelectric Potentials of Plants and Their Functional Significance: V. Some Daily and Seasonal Changes in the Electrical Potential and Resistance of Living Trees", *Can. J. Bot.*, Abstract only, 41(6):831-851, (1963).

Gensler et al., "Investigation of the Causative Reactant of the Apoplast Electropotentials of Plants", *J. Electrochem. Soc.: Electrochem. Sci. Tech.*, 135(12):2991-2995 (1988).

Gensler, W., "An Electrochemical Instrumentation System for Agriculture and the Plant Sciences", *J. Electrochem. Soc.: Electrochem. Sci. Tech.*, 127(11):2365-2370 (1980).

Koppan et al., "Annual Fluctuation in Amplitudes of Daily Variations of Electrical Signals Measured in the Trunk of a Standing Tree", *Life Sci.*, 323:559-563 (2000).

Ksenzhek et al., "Electrical Properties of Plant Tissues. Resistance of a Maize Leaf", *Bulg. J. Plant Physiol.*, 30(3-4):61-67 (2004).

Labady et al., "Plant Bioelectrochemistry: Effects of CCCP on Electrical Signaling in Soybean", *Bioelectrochem.*, 57:47-53 (2002).

Lanzerotti, L.J., "Telluric Currents: The Natural Environment and Interactions with Man-Made Systems", http://www.nap.edu/openbook/0309036801/html/232.html, Chapter 16, pp. 232-257 (2000).

Levengood, W.C., "Bioelectric Currents and Oxidant Levels in Plant Systems", *J. Exper. Botany*, 24(81):626-639 (1973).

MHT, "Plugged in: Startup Hopes to Tap Electricity From Trees", *Plugged in: Startup Hopes to Tap Electricity from Trees*, file://D:\Papers cited in Publication\Calnan.htm, 2 pages (2006).

Niklas et al., "Invariant Scaling Relationships for Interspecific Plant Biomass Production Rates and Body Size", *PNAS*, 98(5):2922-2927 (2001).

Silva-Diaz et al., "In Vivo Cyclic Voltammetry in Cotton Under Field Conditions", *J. Electrochem. Soc.: Electrochem. Sci .Tech.*, 130(7):1464-1468 (1983).

Wegner et al., "Simultaneous Recording of Xylem Pressure and Trans-Root Potential in Roots of Intact Glycophytes Using a Novel Xylem Pressure Probe Technique", *Plant, Cell Environ.*, 21:849-865 (1998).

Wright et al., "Measurement of the Sieve Tube Membrane Potential", *Plant Physiol.*, 67:845-848 (1981).

* cited by examiner

POWER FROM A NON-ANIMAL ORGANISM

RELATED APPLICATIONS

This application is a continuation-in-part of U.S. application Ser. No. 11/302,709, filed Dec. 13, 2005 now U.S. Pat. No. 7,466,032, which is incorporated by reference herein in its entirety. This application claims priority to U.S. Provisional Application No. 60/758,847, filed Jan. 13, 2006; U.S. Provisional Application No. 60/761,822, filed Jan. 24, 2006; U.S. Provisional Application No. 60/784,537, filed Mar. 21, 2006; U.S. Provisional Application No. 60/803,059, filed May 24, 2006; and U.S. Provisional Application No. 60/805,676, filed Jun. 23, 2006, all of which are incorporated by reference herein in their entirety.

BACKGROUND

Since the late-nineteenth century the use of, and uses for, electricity has increased tremendously, becoming a fundamental part of everyday life for most people. One only has to look at remote parts of the world to see how drastically different life is without electricity. Most electric devices in use today typically draw between a few milliwatts to several megawatts of power, depending on the application. Higher costs for the fuels needed to generate electricity, and a higher electrical demand in general, however, have led to increased electricity costs, thereby increasing the attractiveness of alternative power sources.

One typical use of electricity is a light emitting diode (LED). LEDs have seen increasing popularity in recent times due to a lower per unit cost and a greater number of available colors. LEDs are more energy efficient (i.e., less power is consumed) and generally have a much longer life expectancy than conventional filament-based light bulbs. In general, LEDs draw approximately 20 mA at 2V (i.e., 40 mW) when illuminated, which is far less than conventional light bulbs.

Distribution of electricity from a generation plant to the end-user is not a trivial problem. Thousands of miles of wires and cables creating a transmission network are involved in delivering power to consumers. The transmission network adds costs such as material costs and the cost of lost energy due to the resistance of the transmission wires. For the average consumer of electricity, the transmission costs generally equal the cost of the electricity itself. Furthermore, portions of the world have no electricity because it is simply too far from the nearest transmission line or the terrain itself prohibits installation of transmission lines.

SUMMARY

A method for drawing electricity from a non-animal organism, the method including coupling a first electrical conductor to the non-animal organism, coupling a second electrical conductor to a ground rod, embedding the ground rod into soil at a predetermined depth as a function of a desired current level, whereby the current available from the non-animal organism is increased by increasing the depth that the ground rod is embedded into the soil, coupling an electrical load between the first electrical conductor and the second electrical conductor, the electrical load being configured to draw electricity from the non-animal organism via the first electrical conductor, and operating the electrical load using electricity drawn from the non-animal organism.

In general, in another aspect, the invention provides a system including a non-animal organism, a first electrical conductor electrically coupled to the non-animal organism, a plurality of ground rods embedded into soil wherein a quantity of the plurality of ground rods is a function of a desired current level from the non-animal organism, whereby the current available from the non-animal organism is increased by increasing the quantity of the plurality of ground rods, a second electrical conductor coupled to the plurality of ground rods, and an electrical load coupled between the first electrical conductor and the second electrical conductor to draw electricity from the non-animal organism, the electrical load using electricity drawn from the non-animal organism.

In general, in another aspect, the invention provides a method of predicting weather using electricity from a non-animal organism, the method including coupling a first electrical conductor to the non-animal organism, coupling a second electrical conductor to a ground, coupling a voltmeter between the first electrical conductor and the second electrical conductor, measuring a voltage potential between the first and second electrical connectors, providing a weather prediction as a function of the measured voltage potential.

Implementations of the invention may further include the following features. The method of predicting weather including determining a baseline voltage reading for the non-animal organism under a first weather condition, determining a plurality of voltage readings over time, comparing each of the plurality of voltage readings to the baseline voltage reading to determine differences between the baseline voltage reading and each of the plurality of voltage readings, and calculating information indicative of a second, future weather condition as a function of the differences.

In general, in another aspect, the invention provides a system for use with live vegetative matter growing in soil, the system including a non-animal organism, a first electrical conductor electrically coupled to the non-animal organism, and a second electrical conductor coupled to the first electrical conductor and coupled to the live vegetative matter, the second electrical conductor providing electricity from the non-animal organism to the live vegetative matter, wherein the growth of the live vegetative matter is stimulated by the electricity provided by the non-animal organism.

In general, in another aspect, the invention provides a system including a non-animal organism, a first electrical conductor electrically coupled to the non-animal organism, a second electrical conductor coupled to a ground, and an electrical load coupled between the first electrical conductor and the second electrical conductor to draw electricity from the non-animal organism, the electrical load using electricity drawn from the non-animal organism, wherein the load is one of a battery, a battery charging circuit, a sensor, a radio frequency identification chip, a transmitter, a receiver, a global positioning service (GPS) device, a light emitting device, and a fire ignition system.

Implementations of the invention may include one or more of the following features. The load is the sensor and the sensor is one of an oxygen sensor, an air-speed sensor, a humidity sensor, a barometric pressure sensor, a camera, a photoelectric sensor, an altitude sensor, a smoke detector, a microphone, and a vibration sensor. The load is the GPS device and the GPS device is one of a GPS receiver, a GPS transmitter, a GPS guidance system, and a GPS navigation system. The load is the light emitting device and the light emitting device is one of a light emitting diode configured to emit visible light, and an infrared light emitting diode configured to emit an infrared signal.

Various aspects of the invention may provide one or more of the following capabilities. A non-animal organism, such as a member of the plant and/or fungi kingdom, may supply electricity to a load. Electricity may be available in remote areas without an electricity transmission network. Alternative "clean" electricity can be produced. An LED may be powered from a non-animal organism. Infra-red LEDs used in military operations may be powered. A traffic light may be powered from a non-animal organism. A security light may be powered from a non-animal organism. Dependence on fossil fuels to generate electricity may be reduced. Lighting may be provided at campgrounds and/or ski areas using power provided from non-animal organisms. Power derived from non-animal organisms may be used to recharge batteries in hybrid vehicles. Advance storm warning can be obtained by measuring the voltage provided by the non-animal organism.

These and other capabilities of the invention, along with the invention itself, will be more fully understood after a review of the following figures, detailed description, and claims.

DETAILED DESCRIPTION

Embodiments of the invention provide techniques for drawing electricity from non-animal organisms such as members of the plant and/or fungi kingdom, and providing the electricity to a load. Non-animal, non-mammal organisms such as spermatophytes, pteridophytes, succulents, Marattiales ferns, Ophioglossales ferns, Leptosporangiate ferns, Mycophycota fungi, Zygomycota fungi, Basidiomycota fungi, and Ascomycota fungi may be used. Specifically, electricity can be drawn from vegetative matter such as a living tree. The amount of available electricity has been found to depend on the location and type of non-animal organism, and to be approximately 0.5-2 volts DC, plus some AC current. For example, an apparatus for using this energy includes a conductor inserted into a tree and connected to a positive terminal of a load. A negative conductor of the load is connected to a grounded conductor, thereby completing a circuit. Other circuitry, such as charging circuits and/or voltage step-up circuits, may also be used. Other embodiments are within the scope of the invention.

Figure 1:
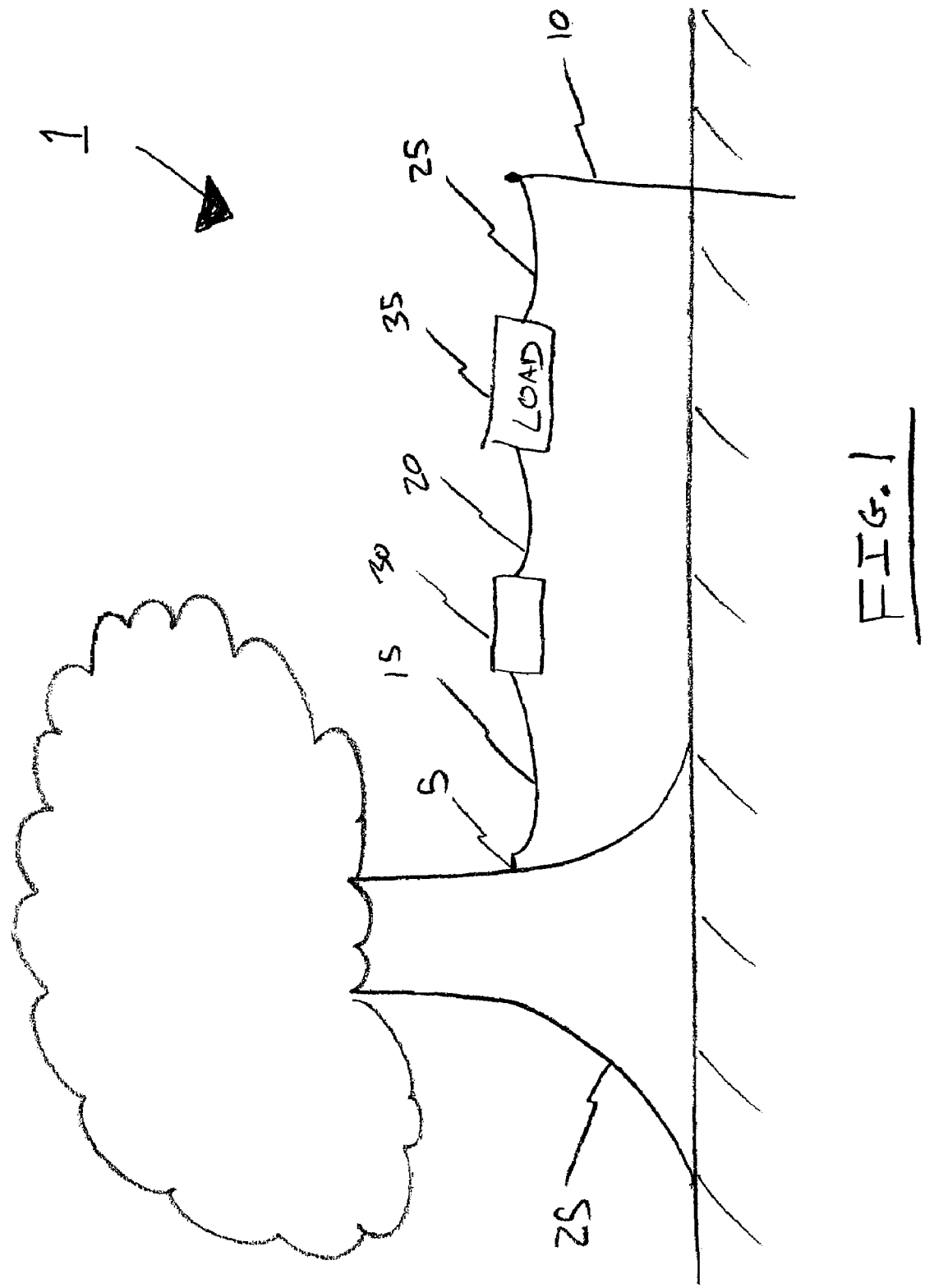
FIG. 1 is a diagram of an apparatus for drawing power from a tree.

Referring to FIG. 1, an apparatus 1 for deriving electricity from a tree 25 includes a tap 5, a conductor 10, wires 15, 20, and 25, a circuit 30, and a load 35. The tap 5 is configured to attach to, and to conduct current flow from, the tree 25. For example, the tap 5 may be configured to be inserted into the tree 25, although other configurations are possible (e.g., a non-invasive transformer core that surrounds the circumference of the tree 25). The wire 15 is electrically coupled to the tap 5 and the circuit 30. The wire 20 is electrically coupled to the circuit 30 and the load 35. The wire 25 is electrically coupled to the load 35 and the conductor 10. The conductor 10 is electrically conductive and is configured to be inserted approximately two feet into the ground while protruding above the ground, although the conductor 10 may be configured to be inserted to other depths. By increasing the depth that the conductor 10 is inserted into the ground and/or using multiple conductors 10, the load 35 can draw more current from the tree 25. The conductor 10 is preferably a tinned copper rod. Other materials and/or configurations of the conductor 10 are possible. For example the conductor 10 may be aluminum and/or connected to a "ground" connection of a typical household electrical system. The circuit 30 is electrically conductive and is configured to filter the power provided by the tree, to step-up (or step-down) the voltage supplied by the tree 25, and/or to store the power provided by the tree 25. The circuit 30 may perform functions other than those listed above. Also, embodiments of the apparatus 1 without the circuit 30 are possible (e.g., connecting a load directly between the tree 25 and the conductor 10).

The load 35 can be any of a number of different devices used for a variety of purposes. For example, the load 35 can include a lithium battery that is charged by the tree 25, a sensor (e.g., capable of sensing temperature, air speed, humidity, barometric pressure, video, audio, light, vibration, altitude, oxygen levels), a remote sensor (e.g., over a LAN, WAN, the Internet, WiFi), a radio frequency identification (RFID) chip, a transmitter, and/or a receiver. The load 35 can be a device for use with a global positioning system (GPS) such as a GPS receiver, a GPS transmitter, a GPS guidance system, and/or a GPS navigation system. The load 35 can include a fire and/or smoke detection system, a system configured to charge a battery powered device (e.g., a mobile phone, a laptop computer, a portable GPS system, a flashlight, a radio), a lighting system (e.g., for recreational use, for military use)(including, e.g., one or more light emitting diodes (LEDs) such as infrared LEDs), a fire ignition system (e.g., for campground use), a weather detection and/or monitoring system, an emergency alert/assistance beacon, a solar lighting backup system, and/or a wireless transmission system for use with a computer. The load 35 can include a plant (e.g., as described below in Experiment 4).

Various embodiments of the tap 5 are possible. Preferably, the tap 5 is a stainless steel rod, e.g., a nail, having an outside diameter of about 0.125 inches, but other materials and sizes are possible. For example, brass plated or aluminum rods having an outside diameter of about 0.06 inches may be used. The tap 5 is electrically conductive material and is preferably of a material (e.g., stainless steel) that has a relatively high corrosion resistance, thus inhibiting increased resistance caused by corrosion. For extended use, the tap 5 is preferably not copper (at least on its exterior) as this can negatively affect (e.g., kill) many types of trees. The tap 5 is preferably configured to be inserted between about 0.375 inches and about 0.75 inches into the tree 25, although other depths are possible. In trees with thick bark, the tap 5 may be inserted further into the tree 25. For example, if a tree has bark 1 inch thick, the tap 5 may be inserted about 1.5 inches into the tree 25. The tap 5 is preferably inserted into the tree 25 between about one and about six feet above ground level, although other heights may be used. While the apparatus 1 includes the one tap 5, multiple taps may be used. Using multiple taps in a single tree has been found to increase the amount of current available from the tree. The taps may all be the same, or one or more taps may be different (e.g., a different material, configured for different insertion depth, etc.) than another tap.

Figure 2:
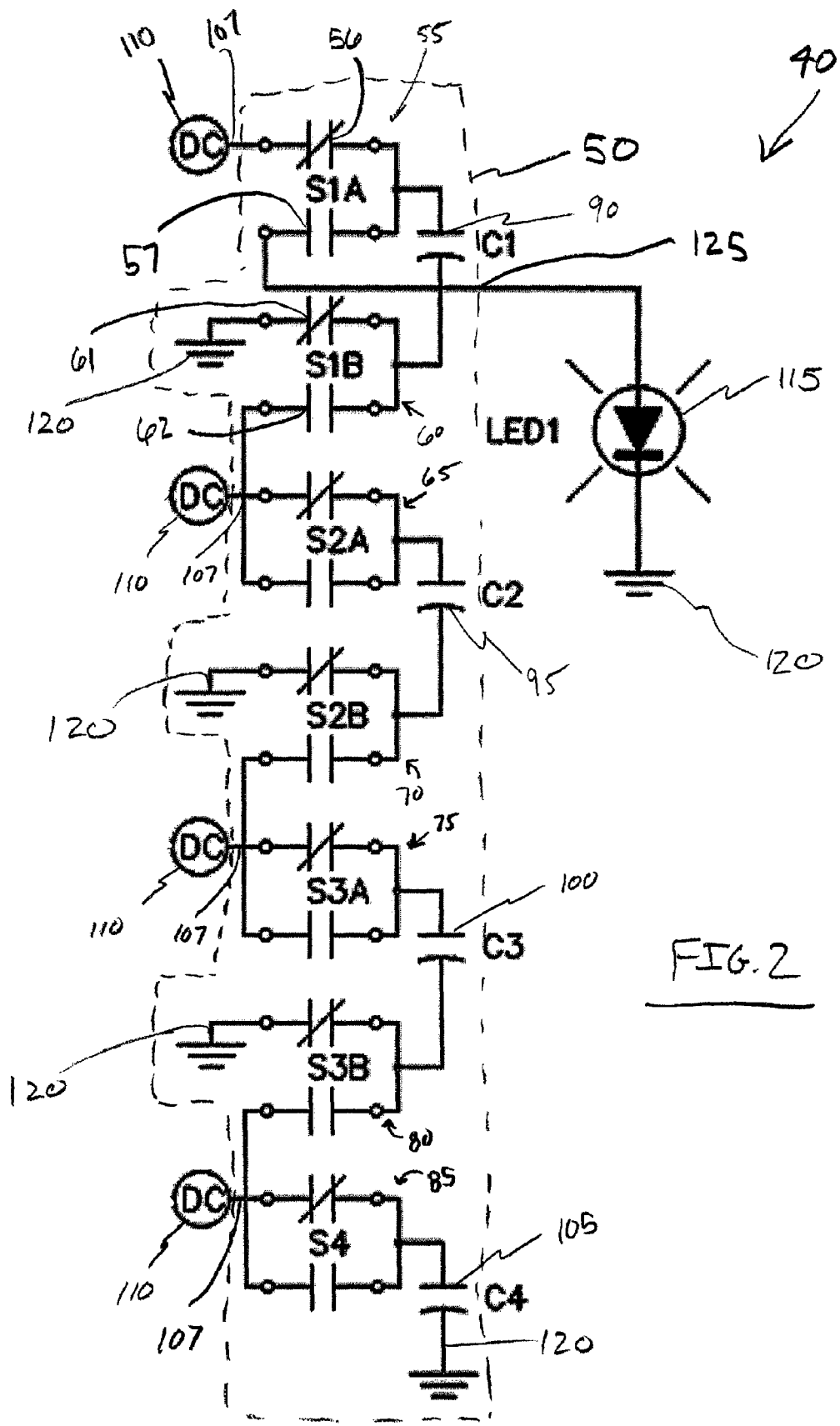
FIG. 2 is a diagram of a charging circuit used to provide power derived from a tree to a load.

Referring also to FIG. 2, an exemplary embodiment 40 of the apparatus 1 including an LED load 115, and an exemplary circuit 30 that is a charging circuit 50, which includes switches 55, 60, 65, 70, 75, 80, and 85, and capacitors 90, 95, 100, and 105. The switches 55, 60, 65, 70, 75, 80, and 85 are single-pole double-throw (SPDT) switches. The switch 55 includes selective connections 56 and 57. The switch 57 is connected on one side to the switch 56 and the capacitor 90 and on its other side to an output 125 configured to be connected to the load 115. The switch 60 also includes selective connections 61 and 62. When the switches 55 and 60 are in a first state, the connections 56 and 61 are closed and the connections 57 and 62 are open, thereby coupling the capacitor 90 between a power source 110 (here, a tree) and a ground 120. When the switches 55 and 60 are in a second state, the connections 56 and 61 are open, and the connections 57 and 62 are closed, thereby coupling the capacitor 90 between the load LED 115, and the switch 65. Each of the switches 55, 65, 75, and 85 are coupled to the tree 110 via the tap 107. The switches 65, 70, 75, 80, and 85 operate as described with respect to the switches 55 and 60.

The capacitors 90, 95, 100, and 105 are coupled to the switches 55, 60, 65, 70, 75, 80, and 85 such that when the switches 55, 60, 65, 70, 75, 80, and 85 are in a first state, the circuit 50 is in a charging state and each of the capacitors 90, 95, 100, and 105 are coupled between the power source 110 and the ground 120. When the switches 55, 60, 65, 70, 75, 80, and 85 are in the first state the capacitors 90, 95, 100, and 105 accumulate an electrical charge. The capacitors 90, 95, 100, and 105 are further coupled to the switches 55, 60, 65, 70, 75, 80, and 85 such that when the switches 55, 60, 65, 70, 75, 80, and 85 are in a second state, the circuit 50 is in a discharging state and the capacitors 90, 95, 100, and 105 are coupled in series between the ground 120 and a load 115 thus providing power to the load 115. The voltage provided to the load 115 is substantially equal to the sum of the voltages across each of the capacitors 90, 95, 100 and 105. The capacitors 90, 95, 100, and 105 are preferably about 10,000 μF, but other capacitances are possible. While an LED is shown as the load 115, other loads may be used.

While the charging circuit 50 is shown coupled to a single tree (i.e., the tree 110), other configurations are possible. For example, each of the switches 55, 65, 75, and 85 may be connected to separate trees. The switches 55, 65, 75, and 85 could each be connected to multiple trees (or other non-animal organisms). One or more of the switches 55, 65, 75, and 85 could each be connected to a single tree with multiple taps 107. One of the switches 55, 65, 75, and 85 could be connected to a single tree with a single tap, with the remainder of the switches 55, 65, 75, and 85 being connected to multiple trees, each with multiple taps. One of the switches 55, 65, 75, and 85 could be connected to a single tree with multiple taps, with the remainder of the switches 55, 65, 75, and 85 being coupled to a single tree with multiple taps. Each of the switches 55, 65, 75, and 85 may be coupled to a single tree or multiple trees using more than one of the tap 107.

Figure 3:
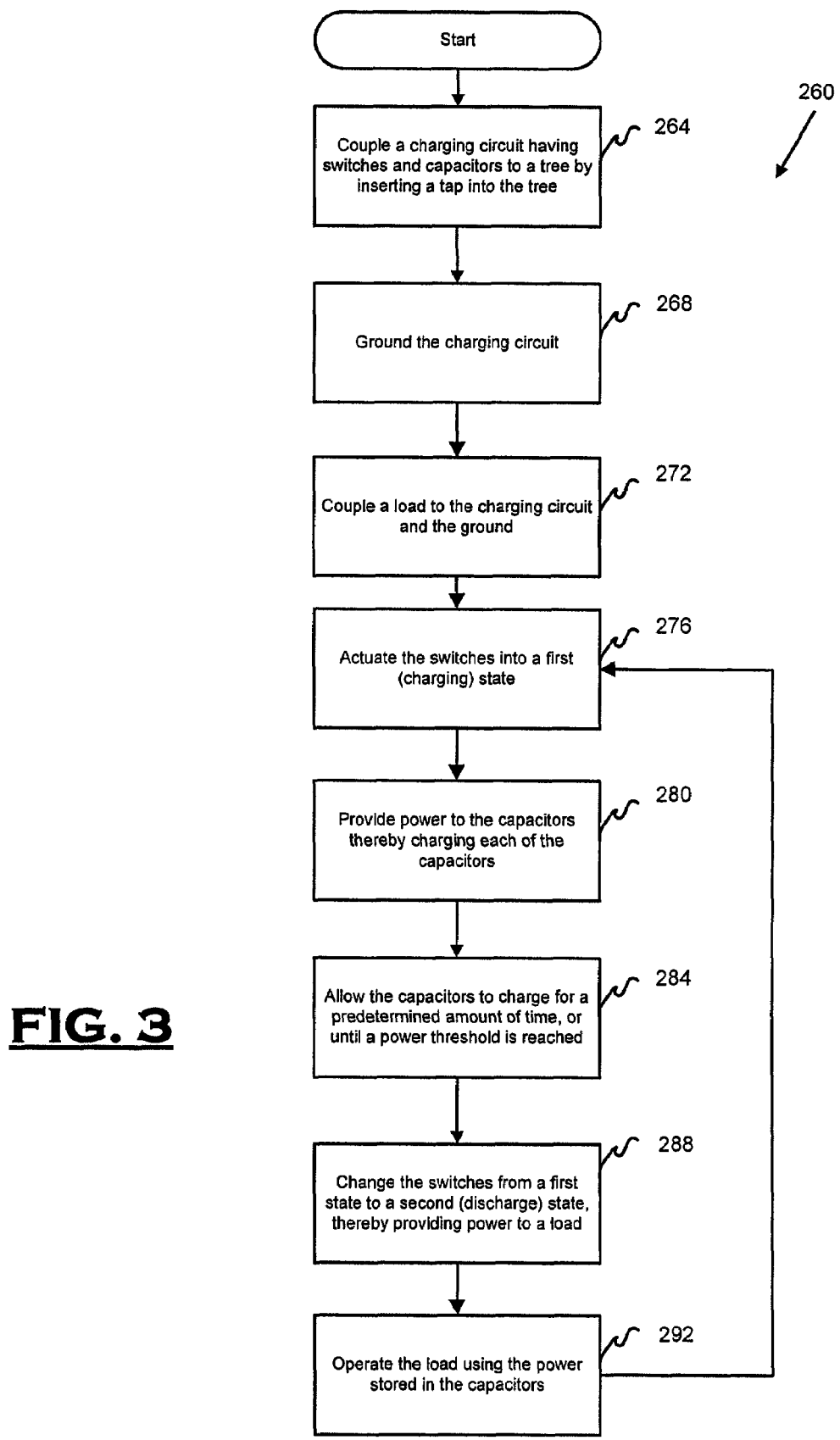
FIG. 3 is a flowchart of a process for deriving power from a tree using the charging circuit shown in FIG. 2.

In operation, referring to FIG. 3, with further reference to FIG. 2, a process 260 for providing power derived from a tree to a load using the apparatus 40 includes the stages shown. The process 260, however, is exemplary only and not limiting. The process 260 may be altered, e.g., by having stages added, removed, or rearranged.

At stage 264, the charging circuit 50 is coupled to the living non-animal organism power source 110, such as a tree, a plant, etc. Preferably, the tap 107 is inserted into the power source 110. The tap 107 is inserted approximately 0.375 inches to 0.75 inches into the tree. Alternatively, a non-invasive tap may be used, e.g., a transformer core can be placed around a circumference of the tree.

At stage 268, the charging circuit 50 is grounded. Preferably, the charging circuit 50 is coupled to a ground rod, or other suitable electrical ground, such as a ground connection in a typical residential power system. More current may be drawn from the living non-animal organism by the load 115 by increasing the depth that the ground rod is inserted into the ground and/or using multiple ground rods.

At stage 272, the load 115 is coupled between the charging circuit 50 and the ground 120. The load 115 is coupled on one side to the output 125 of the charging circuit 50 and on its other side to the ground 120.

At stage 276, the switches 55, 60, 65, 70, 75, 80, and 85 are actuated into the first (charging) state. The connections 56 and 61 of the switches 55 and 60 are closed, the connections 57 and 62 of the switches 55 and 60 are opened, and likewise for the switches 65, 70, 75, 80, and 85. This couples the capacitors 90, 95, 100, and 105 to the taps 107.

At stage 280, the power is provided from the tree 110 to the capacitors 90, 95, 100, and 105. The capacitors 90, 95, 100, and 105 store energy received from the taps 107.

At stage 284, the capacitors 90, 95, 100, and 105 are allowed to charge. The amount of time the capacitors 90, 95, 100, and 105 are charged may vary to suit a specific application. For example, to provide sufficient power to illuminate the LED, each of the capacitors 90, 95, 100, and 105 is charged to 0.5 Vdc. The amount of time for the capacitors 90, 95, 100, and 105 to reach 0.5 Vdc may vary depending on the amount of power supplied by a particular power source.

At stage 288, the switches 55, 60, 65, 70, 75, 80, and 85 are changed from the first state to the second state to discharge the power accumulated in the capacitors 90, 95, 100, and 105, thereby providing power to the load 115.

The power from the capacitors 90, 95, 100, and 105 is used to operate the load 115, here causing the LED to emit light. The process 260 returns to stage 276 where the switches 55, 60, 65, 70, 75, 80, and 85 are changed from the second state to the first state, thereby providing power from the taps 107 to the capacitors 90, 95, 100, and 105.

Figure 4:
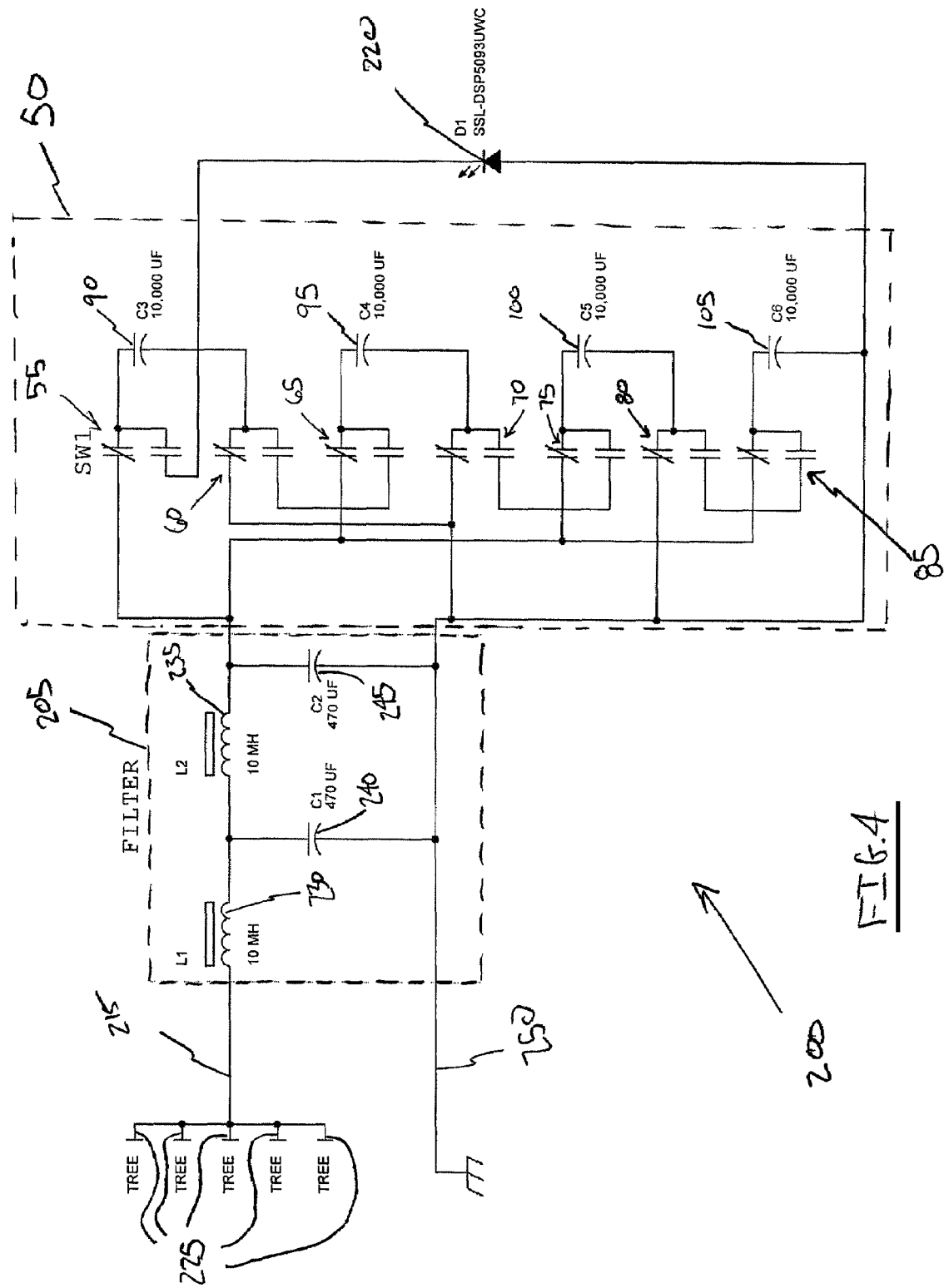
FIG. 4 is a circuit diagram of a filtered charging circuit used in providing electricity from a tree to a load, including the charging circuit of FIG. 2 and a filter.

Referring to FIGS. 2 and 4, a filtered charging circuit 200 includes a filter circuit 205 and the charging circuit 50, which are coupled to a power input 215, a load 220 (in FIGS. 2 and 4 an LED), and a ground connector 250. The filter circuit 205 is coupled between the power input 215 and the charging circuit 50, and is configured to provide substantially DC power to the charging circuit 50. The power input 215 is coupled to multiple taps 225 configured to be inserted into one or more trees. As described above with reference to FIG. 2, the charging circuit can provide the load 220 with a stepped-up, substantially DC voltage.

The filter circuit 205 includes inductors 230 and 235, and capacitors 240 and 245. The inductors 230 and 235 are coupled in series between the power input 215 and the charging circuit 50 to inhibit high-frequency power produced by the tree from reaching the charging circuit 50. The capacitor 240 is coupled between the junction of the inductors 230 and 235 and the ground 250. The capacitor 245 is coupled between the junction of the inductor 235 and the charging circuit 50 and the ground 250. For example, the inductors 230 and 235, and the capacitors 240 and 245 are arranged in a 2-stage pie filter configuration. The capacitors short-out (e.g., ground) high-frequency power produced by the tree, further inhibiting non-DC power from being conducted to the charging circuit 50. The inductors 230 and 235 are preferably about 10 mH, although other inductances are possible. The capacitors 240 and 245 are preferably about 470 µF, although other capacitances are possible. The charging circuit 50 is configured to receive substantially DC power from the filter circuit 205, and to output intermittent DC power to the load 220 similar to the description provided above with respect to FIG. 2.

Figure 5:
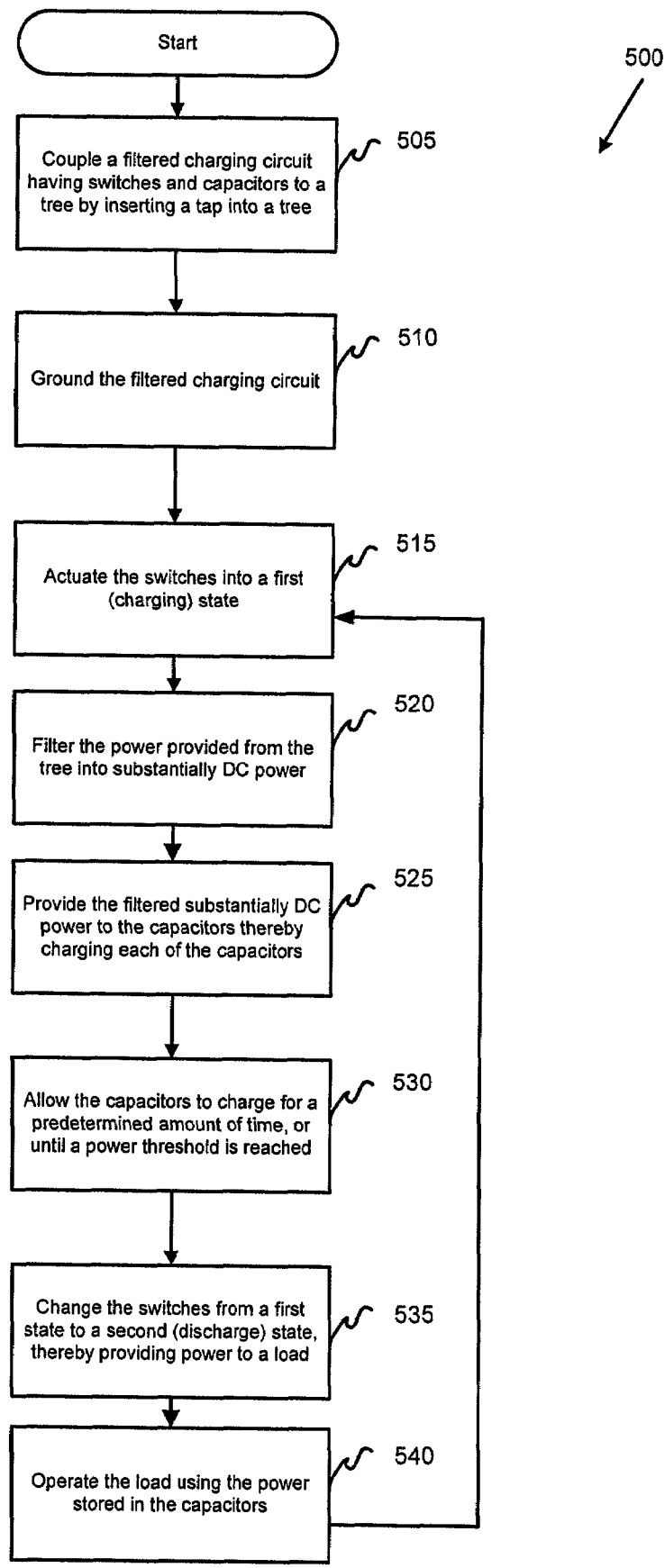
FIG. 5 is a flowchart of a process of deriving power from a tree using the electrical circuit shown in FIG. 4.

In operation, referring to FIG. 5, with further reference to FIG. 4, a process 500 for providing power derived from a tree to the load 220 using the filtered charging circuit 200 includes the stages shown. The process 500, however, is exemplary only and not limiting. The process 500 may be altered, e.g., by having stages added, removed, or rearranged.

At stage 505, the filtered charging circuit 200 is coupled to the power input 215 such as a tree, a fungus, or other suitable non-animal organism, here by inserting the taps 225 into a single tree. Each of the taps 225 is inserted approximately 0.375 inches to approximately 0.75 inches into the tree. If any of the taps 225 are non-invasive, then that (those) taps(s) 225 (e.g., a transformer core) is (are) mounted accordingly. (e.g., placed around the circumference of a tree).

At stage 510, the filtered charging circuit 200 is coupled to ground. The filtered charging circuit 200 is connected to the ground connector 250, such as a rod, or other suitable electrical ground connector (e.g., a ground connection in a typical residential power system). More current may be drawn from the living non-animal organism by the load 220 by increasing the depth that the ground rod is inserted into the ground and/or using multiple ground rods.

At stage 515, the switches 55, 60, 65, 70, 75, 80, and 85 are actuated into a first (charging) state coupling the capacitors 90, 95, 100, and 105 to the filter circuit 205. Power flows from the filter circuit 205 to the capacitors 90, 95, 100, and 105.

At stage 520, the power derived from the tree is filtered to substantially remove alternating current (AC). At stage 520 the filter circuit 205 filters the power derived from the taps 225 into substantially DC power. The combination of the inductors 230 and 235 and the capacitors 240 and the 245 substantially filters out non-DC frequencies produced by the tree. The inductors 230 and 235 choke the high-frequencies produced by the tree. The capacitors 240 and 245 inhibit low frequency power and conduct high-frequency power to the ground connector 250. The filter circuit 205 provides the filtered substantially DC power to the charging circuit 50.

At stage 525 the filtered substantially DC power from the filter circuit 205 is provided to the capacitors 90, 95, 100, and 105. The switches 55, 60, 65, 70, 75, 80, and 85 are put in the first state to couple the circuit 205 to the capacitors 90, 95, 100, and 105 to provide power to, and charge, the capacitors 90, 95, 100, and 105. At stage 530, the capacitors 90, 95, 100, and 105 are allowed to charge. The amount of time the capacitors 90, 95, 100, and 105 are charged varies, and may be tailored to suit a specific application. For example, to provide sufficient power to illuminate the load 220, each of the capacitors is charged to 0.5 Vdc. The amount of time required to reach 0.5 Vdc may vary depending on the amount of power supplied by a particular power source.

At stage 535, the switches 55, 60, 65, 70, 75, 80, and 85 are changed from the first state to the second state to discharge the power accumulated in the capacitors 90, 95, 100, and 105, thereby providing power to the load 220.

After stage 535, the switches 55, 60, 65, 70, 75, 80, and 85 are actuated from the second state to the first state, thereby providing filtered substantially DC power from the filter circuit 205 to the charging circuit 50. The stages 515, 520, 525, and 530 may be repeated.

At stage 540, the power from the capacitors 90, 95, 100, and 105 is used to operate the load 220, here causing the LED to emit light. The process 500 returns to stage 515 where the switches 55, 60, 65, 70, 75, and 85 are changed from the second state to the first state, thereby providing power from the taps 225 to the capacitors 90, 95, 100, and 105

Figure 6:
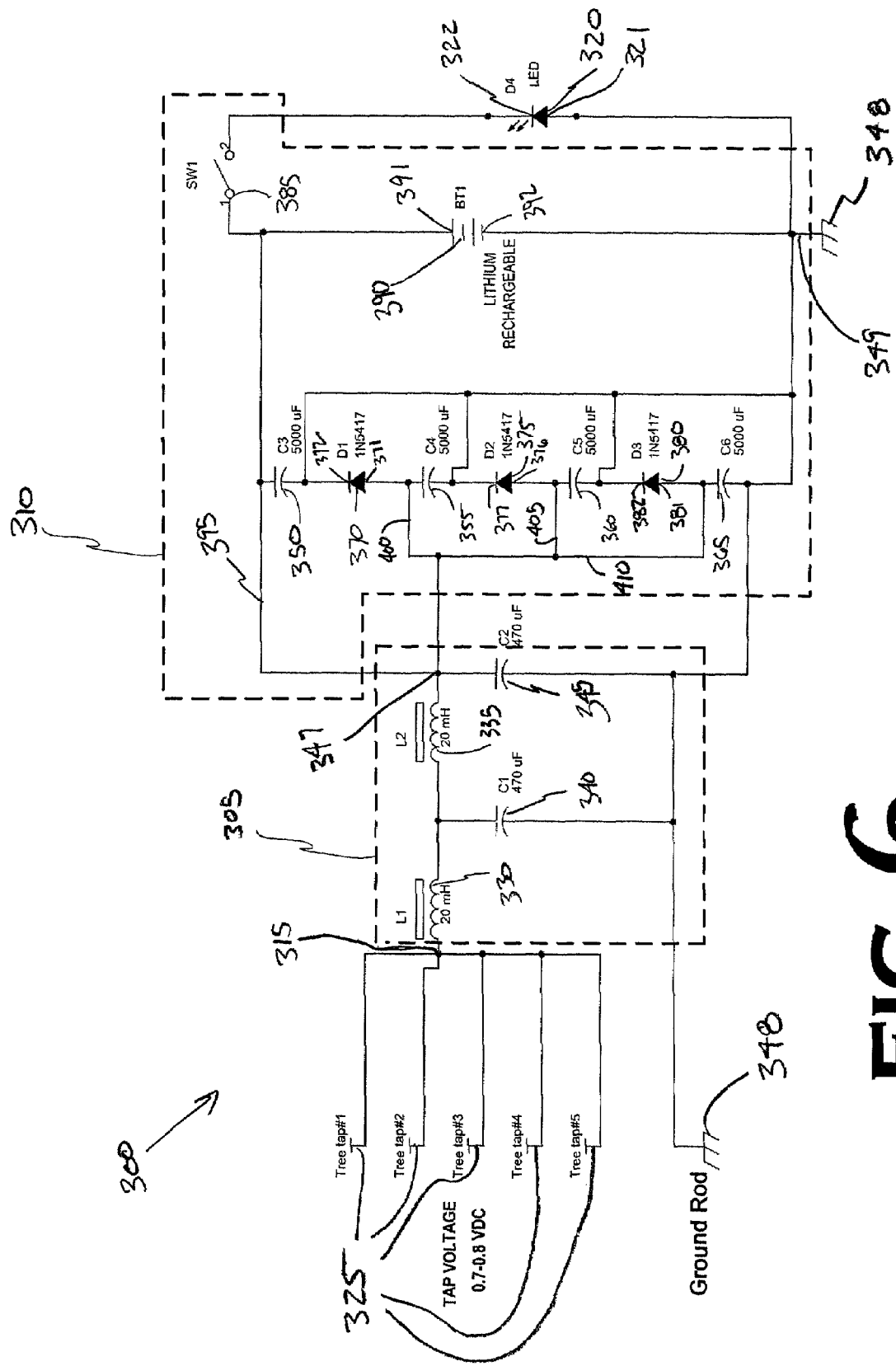
FIG. 6 is a circuit diagram of a filtered charging circuit used in providing electricity from a tree to a load and including a battery.

Referring to FIG. 6, a filtered charging circuit 300 includes a filter circuit 305 and a charging circuit 310, which are coupled to a power input 315 and a load 320 (in FIG. 6, an LED). The filter 305 is coupled between the power input 315 and the charging circuit 310, and is configured to provide substantially DC power to the charging circuit 310. The power input 315 is coupled to multiple taps 325 that are each configured to be inserted into a tree. The load 320 is preferably a SSL-DSP5093UWC LED (manufactured by Lumex Incorporated, of Palatine, Ill.), although other LEDs, and other types of loads, may be used.

The filter circuit 305 includes inductors 330 and 335, capacitors 340 and 345, and an output node 347. The inductors 330 and 335 are coupled in series between the power input 315 and the output node 347 and are of inductances to serve as chokes of any high-frequencies received at the power input 315. The capacitor 340 is coupled between the junction of the inductors 330 and 335 and the ground 348. The capacitor 345 is coupled between the output node 347 and the ground 348. For example, the inductors 330 and 335, and the capacitors 340 and 345 are arranged in a 2-stage pie filter configuration. The inductors 330 and 335 are preferably about 10 mH, although other inductances are possible. The capacitors 340 and 345 work in conjunction with the inductors 330 and 335 shorting-out high frequency signals that may have passed through the inductors 330 and 335, respectively. The capacitors 340 and 345 are preferably about 470 µF, although other capacitances are possible.

The charging circuit 310 includes capacitors 350, 355, 360, and 365, diodes 370, 375, and 380, a switch 385, a battery 390, and a ground connection 349 connected to the ground 348. Coupled between the output node 347 and the ground connection 349 are the capacitors 350, 355, 360, and 365, and the diodes 370, 375, and 380, in an alternating series of capacitors and diodes. Anodes 371, 376, and 381 of the diodes 370, 375, and 380, respectively, are coupled to the output node 347. Cathodes 372, 377, and 382 of the diodes 370, 375, and 380, respectively, are coupled to the ground connection 349. The capacitor 350 is coupled between the cathode 372 of the diode 370 and the output node 347. The capacitor 365 is coupled between the anode 381 of the diode 380 and the ground connection 349. The capacitors 350, 355, 360, and 365, and the diodes 370, 375, and 380 act as a voltage multiplier circuit to allow filtered substantially DC power to charge the capacitors 350, 355, 360, and 365 (e.g., by summing the voltages across the capacitors 350, 355, 360, and 365). Using the capacitors 350, 355, 360, and 365, and the diodes 370, 375, and 380, a higher voltage (e.g., 2-2.5 V) is produced to charge the battery 390. The capacitors 350, 355, 360, and 365 are 5,000 µF, although other capacitances are possible, such as 10,000 µF. The diodes 370, 375, and 380 are preferably 1N5417 diodes, but other diodes are possible.

The battery 390 is coupled between the output node 347 and the ground 348 such that it may receive power from the output node 347. The battery 390 is preferably a lithium-ion battery, but other batteries may be used. A positive terminal 391 of the battery 390 is coupled to the output node 347 and the switch 385. A negative terminal 392 of the battery 390 is coupled to the ground 348. Other configurations are possible (e.g., coupling the negative terminal 392 to the output node 347, and coupling the positive terminal 391 to the ground 348).

The switch 385 is coupled between a terminal 322 of the load 320 and output node 347 to control a power flow to the load 320. When the switch 385 is in an open state (as shown), power is inhibited (and preferably prevented) from flowing to the load 320. When the switch 385 is in a closed state, power may flow to the load 320. A terminal 321 of the load 320 is coupled to the ground 348.

Figure 7:
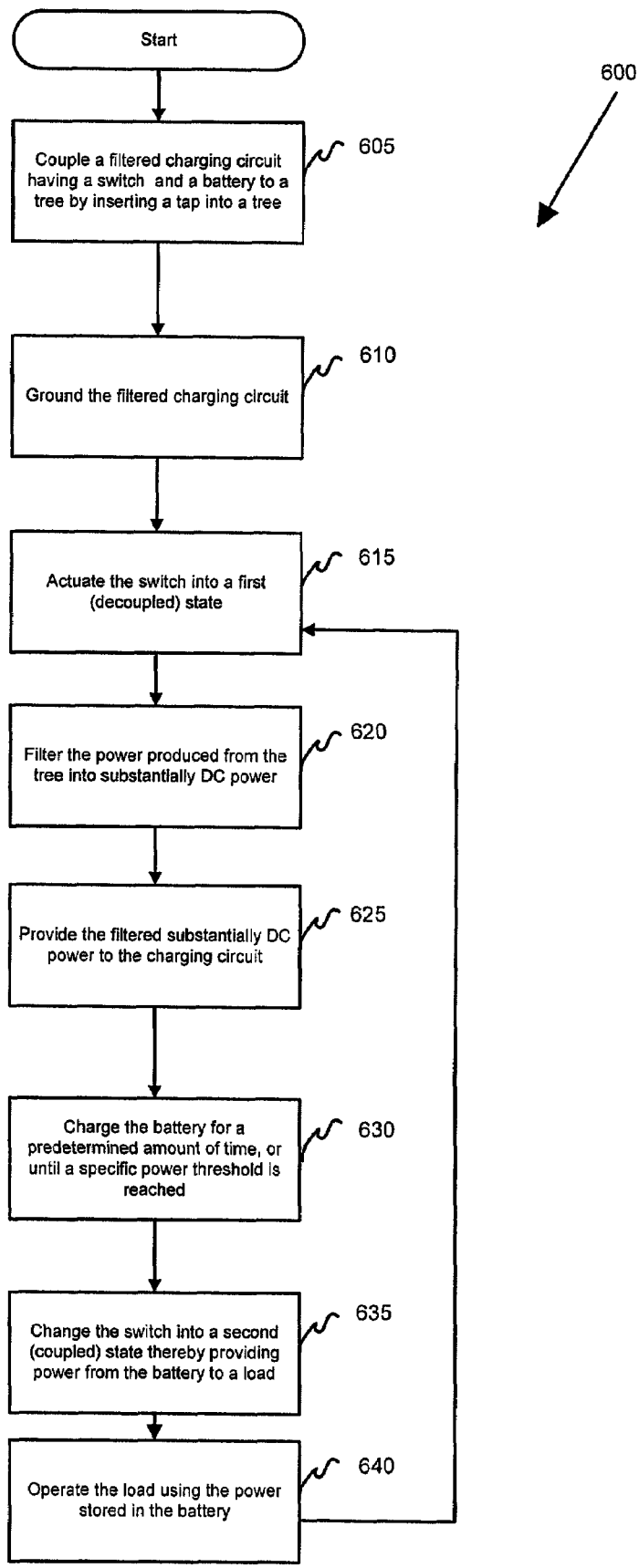
FIG. 7 is a flowchart of a process of deriving power from a tree using the electrical circuit shown in FIG. 6.

In operation, referring to FIG. 7, with further reference to FIG. 6, a process 600 for providing power derived from a tree to the load 320 using the filtered charging circuit 300 includes the stages shown. The process 600, however, is exemplary only and not limiting. The process 600 may be altered, e.g., by having stages added, removed, or rearranged.

At stage 605, the filtered charging circuit 300 is coupled to the power input 315 such as a tree, a fungus, or other suitable non-animal organism, here by inserting the taps 325 into a single tree. Each of the taps 325 is inserted approximately 0.375 inches to approximately 0.75 inches into the tree. If any of the taps 325 are non-invasive, then that (those) taps(s) 325 (e.g., a transformer core) is (are) mounted accordingly. (e.g., placed around the circumference of a tree).

At stage 610, the filtered charging circuit 300 is coupled to ground. The filtered charging circuit 300 is connected to the ground connector 349, such as a rod, or other suitable electrical ground connector (e.g., a ground connection in a typical residential power system). More current may be drawn from the living non-animal organism by the load 320 by increasing the depth that the ground rod is inserted into the ground.

At stage 615, the switch 385 is actuated into the first state (i.e., open) where the load 320 is disconnected from the filtered charging circuit 300 and current is inhibited/prevented from reaching/operating the LED 320.

At stage 620, the power derived from the tree is filtered to substantially remove alternating current (AC). At stage 620 the filter circuit 305 filters the power derived from the taps 325 into substantially DC power. The combination of the inductors 330 and 335 and the capacitors 340 and the 345 substantially filters out non-zero frequencies produced by the tree. The inductors 330 and 335 choke the high-frequencies produced by the tree. The capacitors 340 and 345 inhibit low frequency power and conduct high-frequency power to the ground connector 349. The filter circuit 305 provides the filtered substantially DC power to the charging circuit 310.

At stage 625, the filtered substantially DC power is provided to the charging circuit 310 via the output node 347. Power provided from the output node 347 is conducted through the capacitors 350, 355, 360, and 365, and the diodes 370, 375, and 380. The configuration of the diodes 370, 375, and 380 allows substantially only filtered DC power to charge the capacitors 350, 355, 360, and 365.

At stage 630, the battery 390 is charged using power from the output node 347 and the capacitors 350, 355, 360, and 365. The amount of time the battery 390 is charged varies, and may be tailored to suit a specific application. The battery 390 may be charged for a specific predetermined amount of time, or may be charged until a certain power threshold is reached.

At stage 635 the switch 385 is actuated into the second state (e.g., closed) coupling the load 320 across the terminals 391 and 392 of the battery 392, thereby providing power from the battery 390 to the LED 320. Power may also be provided to the load 320 from the output node 347 and/or the capacitors 350, 355, 360, and 365. The stages 615, 620, 625, 630, and 635 may be repeated.

At stage 640, the power from the capacitors 350, 355, 360, and 365, and the battery 390 is used to operate the load 320, here causing the LED to emit light. The process 600 returns to stage 615 where the switch 385 is changed from the second state to the first state, thereby decoupling the load 320 from the positive terminal 391 of the battery 390, the output node 347, and the capacitor 350. The switch 385 thus alternates between the first state and the second state to provide intermittent power to the LED 320. Alternatively, the switch 385 can remain in the second state to provide substantially constant power to the LED 320. Other modes of operation are also possible.

Figure 8:
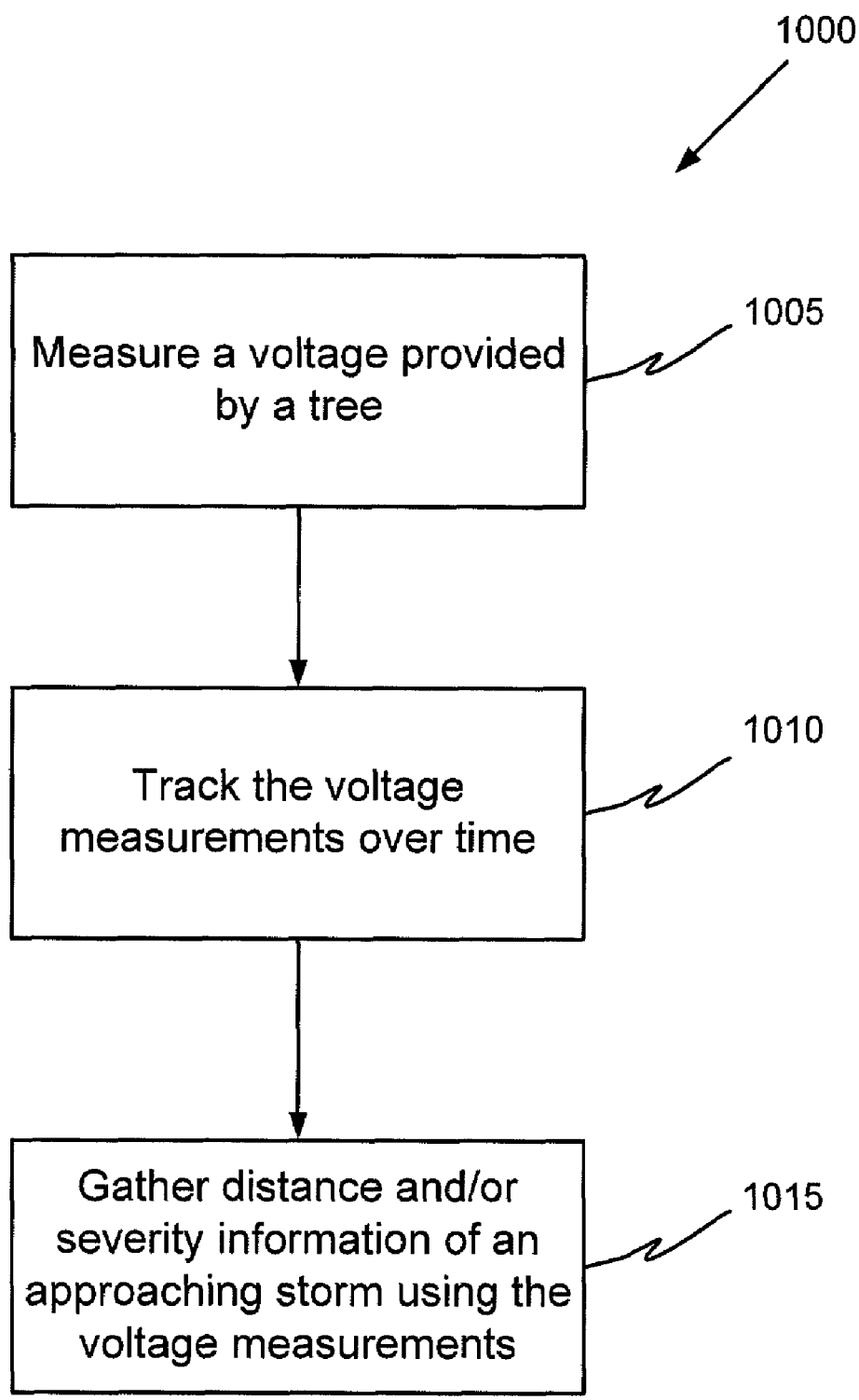
FIG. 8 is a flowchart of a process of determining storm distance and/or severity using voltage measurements taken from a tree.

In operation, referring to FIG. 8, with further reference to FIG. 1, a process 1000 for determining storm distance and/or severity by measuring the voltage provided by the tree 25 includes the stages shown. The process 1000, however, is exemplary only and not limiting. The process 1000 may be altered, e.g., by having stages added, removed, or rearranged.

At stage 1005, the voltage provided by the tree 25 is measured using the apparatus 1. Voltage values are recorded, e.g., at regular time intervals such as every 30 seconds, although other intervals are possible. Preferably, the apparatus 1 is not used to provide power to a load (e.g., the load 35) during stage 1005, although the apparatus 1 can provide power to a load simultaneously with the voltage measurements. The voltage can be measured, for example, by a computer and/or manually.

At stage 1010, the voltage measurements are tracked. For example, a computer system can collect the voltage readings at regular intervals and store the values in a data table with each entry in the table representing a discrete voltage measurement at a known time. Alternatively, a person taking manual measurements can record the measurements manually.

At stage 1015, the voltage measurements are compared to a baseline voltage for the tree 25 (e.g., a voltage value collected on a clear day). If the voltage measurements decrease relative to the baseline voltage of the tree 25, then a conclusion can be reached and an indication can be provided that a storm (e.g., a lightning storm) is approaching. The amount of the voltage drop and/or the speed of the voltage drop when compared to the baseline voltage can be used to determine the severity and/or the distance of an approaching storm. For example, a 0.5V drop in twenty minutes (with the baseline voltage as a reference point) can result in a determination that a more severe storm is approaching than a 0.2V drop in an hour (with the baseline voltage as a reference point). The voltage readings collected and tracked at stages 1005 and 1010 can be used at stage 1015 to determine information about an approaching storm alone (e.g., distance and/or severity), or can be combined with other weather tools, such as Radar and/or satellite imagery, used in predicting weather conditions.

EXPERIMENT 1

Referring to Appendix A, exemplary results of voltage yield tests from different trees using different tap configurations, different ground rod quantities, and different numbers of taps are shown. The tests were performed using the configuration shown in FIG. 1, and described in the corresponding written description, where the load was a voltmeter. The circuit 30, however, as shown in FIG. 1, was omitted in the tests. The tests were performed selecting different geographic locations of the trees, different types of trees, different tap materials, different tap depths, different tap diameters, different tap heights (i.e., height from ground level), different tree altitudes, varying numbers of taps, and varying soil conditions. As shown in Appendix A, factors such as the species and/or the variety of a particular plant, e.g., tree, affects the available voltage and/or current. For example, an oak tree located 40 feet above sea level and a maple tree located 200 feet above sea level provided differing amounts of voltage and/or current. Trees produced a substantially constant DC voltage (and some AC voltage), while other plants produced a less-constant DC voltage than trees. Furthermore, two trees, providing about 0.75V and 0.8V (DC), respectively, were coupled in series. Approximately 0.8V was measured from the second of the two tree coupled in series.

EXPERIMENT 2

The charging circuit 50 (of FIG. 2) was used to successfully power an LED. The charging circuit 50, using four 10,000 µF (35 Vdc) capacitors, successfully illuminated an SSL-DSP5093UWC LED (manufactured by Lumex Incorporated, of Palatine, Ill.) for approximately one second. The charging circuit 50 was placed in the charging state for approximately 1.75 hours, thereby charging the capacitors 90, 95, 100, and 105. At the end of the charging period, there was approximately a 0.5 Vdc potential in each of the capacitors 90, 95, 100, and 105, storing approximately 0.0125 Joules of energy in each of the capacitors 90, 95, 100, and 105. To light the LED, the switches 55, 60, 65, 70, 75, 80, and 85 were actuated, changing the switches 55, 60, 65, 70, 75, 80, and 85 from the first (charging) state, to the second (discharge) state, thereby providing 2 Vdc to the LED (4×0.5 Vdc) and illuminating the LED. After approximately one second of the LED being illuminated, the voltage across the LED dropped to 1.5 Vdc and the LED no longer illuminated (the lower operating threshold of the SSL-DSP5093UWC LED is approximately 1.5V). The capacitors 90, 95, 100, and 105 were allowed to recharge for approximately one hour to again reach a 0.5 Vdc potential across each of the capacitors 90, 95, 100, and 105.

EXPERIMENT 3

The apparatus was used to collect weather related information (exemplary data is shown in Appendix B). Voltage readings were collected as a lightning storm approached from the West of a test site including a tree. As the storm approached the test site, a voltage provided by the tree decreased relative to prior levels. The closer the storm was relative to the test site, the larger the voltage drop. For example, when the storm was several miles away, the voltage provided by the tree dropped about 0.2V compared to a voltage measured from the tree on a clear day. As the storm had substantially reached the test site, the voltage provided by the tree had dropped approximately 0.5V compared to the voltage measured from the tree on a clear day. The approaching storm was an intense lightning storm, including positive lightning. Data consistent with the above description was recorded during other lightning storms. Observations indicate that stronger electrical activity (e.g., lightning) produced by a storm caused a quicker and larger voltage drop. Thus, by measuring the voltage provided by the tree 25, it was possible to gather information regarding the severity of an approaching storm. After a storm had passed over the test site, the voltage provided by the tree would return to "normal" levels within about thirty-five to forty minutes.

EXPERIMENT 4

A modified version of the apparatus 1 shown in FIG. 1 was used to stimulate/enhance the growth of plants including tomato and broccoli plants. Providing electricity produced by a tree to a plant was found to increase growth of the plant, to increase the plant's resistance to pests, and to increase the plant's resistance to frost. A tree was coupled to a plant using the tap 5 and the wire 15, with the plant being the load 35. The plant's root system replaced the conductor 10.

Broccoli Plant

One of several broccoli plants in a group near each other was coupled to an apple tree as described above during an entire growing season. Prior to coupling the apple tree to the broccoli plant, the apple tree produced about 1.1 Vdc and the broccoli plant produced an average of about 0.3 Vdc. As the growing season progressed, the "energized" broccoli plant showed increased growth and increased resistance to pests relative to the other neighboring broccoli plants. For example, the energized broccoli plant grew taller than the other neighboring broccoli plants, and produced a larger center head and more side heads than the other neighboring broccoli plants. An additional experiment was performed by energizing the smallest and weakest broccoli plant of the group of broccoli plants. Within about two to three days of being energized, the newly-energized broccoli plant was about the same size and height as the neighboring non-energized broccoli plants.

The energized broccoli plant was not bothered by pests, whereas the non-energized broccoli plants were attacked by pests. As determined by several visual inspections during the growing season, the energized broccoli plant was substantially untouched by pests, whereas the non-energized broccoli plants' leaves were eaten by pests. As a further experiment, a worm was placed on the energized broccoli plant and then onto one of the other broccoli plants. After being placed on the "energized" broccoli plant, the worm did not eat the broccoli plant and fell off. When the same worm was placed on the non-energized broccoli plant, the worm began eating the broccoli plant soon thereafter. An additional experiment was performed by energizing a pest-inhabited broccoli plant. Within about one hour of being energized, the pests inhabiting the broccoli plant vacated the plant.

Tomato Plant

One of several Cherokee Purple tomato plants in a group near each other was coupled to an elm tree. Prior to coupling the elm tree to the tomato plant, the elm tree produced about 1.2 Vdc. The energized/connected tomato plant included four shoots, each of which were coupled to the elm tree. Visual inspections of the tomato plant revealed that the energized tomato plant grew approximately thirty-three percent higher than the non-energized plants. The energized tomato plant also produced more tomatoes than the non-energized tomato plants. Furthermore, the energized tomato plant survived the first two frosts of the winter season, whereas the non-energized tomato plants died after the first frost.

Other embodiments are within the scope and spirit of the invention, including the appended claims. Features implementing functions may be physically located at various positions, including being distributed such that portions of functions are implemented at different physical locations. Loads other than LEDs may be used, such as a transmitter, receiver, microchip, incandescent light source, infrared light source, a laser, a DC/DC voltage converter, a DC/AC inverter, etc. Power may be drawn from non-animal organisms other than trees. For example, broccoli plants, tomato plants, soybean plants, and mushrooms may be used. Also, potted plants, and potted trees may be used. The tap may be inserted into a branch of the tree. The load can draw more current from the tree using multiple ground rods.

While the tap has been disclosed as a nail, other configurations are possible such as a staple. Non-invasive embodiments of the tap are possible, e.g., a donut-shaped transformer core placed around the circumference of a tree. The surface area of a tap may be increased by, for example, being threaded (e.g., being a screw) and/or placing outwardly disposed barbs on the tap. A tap may have a flange disposed around the circumference of the tap to help a user insert the tap correctly into a tree (e.g., to the correct depth). A tap may include a handle to help in insertion into the tree and/or removal from the tree.

While the terms "connected," "connector," "coupled," and "connection" have been used to indicate a direct connection, other configurations are possible. For example, referring to FIG. 6, when the diode 380 is "coupled" to the capacitor 360, this may include indirect connection through another component (e.g., a resistor coupled between the cathode 382 of the diode 380 and the capacitor 360).

The word "or" is to be construed as including the conjunctive and disjunctive definition.

Further, while the description refers to the invention, the description may include more than one invention.

APPENDIX A

| Test No. | Time Intervals | Voltage DC | Tree Type | Nail Type | Nail Penetration Depth | Nail Diameter | Height from Ground | No. of Nails | Soil Type | Altitude |
|---|---|---|---|---|---|---|---|---|---|---|
| 1 | 7:00 PM | 0.9 VDC | PINE | STAINLESS | 3/4" | 1/8" | 3 FT | 2 | LOAM | |
| 2 | 7:25 | 0.9 VDC | PINE | STAINLESS | 3/4" | 1/8" | 4 FT | 2 | LOAM | |
| 3 | 7:40 | 0.9 VDC | PINE | STAINLESS | 3/4" | 1/8" | 5 FT | 2 | LOAM | |
| 1 | 1:00 PM | 1.0 VDC | PINE | STAINLESS | 3/4" | 1/8" | 5 FT | 2 | CLAY-SAND | |
| 1 | 10 MIN | −1.2 | EIM | | 3/4" | 3/8 | 18" | 1 | SAND | 40 |
| 2 | | −1.6 | BLUE SPRUCE | | 3/4" | 3/8 | 18" | 1 | SAND | 40 |
| 3 | | −1.0 | MAPLE | | 3/4" | 3/8 | 18" | 1 | SAND | 40 |
| 4 | | −1.1 | MAPLE | | 3/4" | 3/8 | 18" | 1 | SAND | 40 |
| 5 | | −1.2 | EIM | | 3/4" | 3/8 | 18" | 1 | SAND | 40 |
| 6 | | −1.1 | WALNUT | | 3/4" | 3/8 | 18" | 1 | SAND | 40 |
| 7 | | −0.8 | LILAC BUSH | | 3/4" | 3/8 | 18" | 1 | SAND | 40 |
| 8 | | −1.1 | ELM | | 3/4" | 3/8 | 18" | 1 | SAND | 40 |
| 9 | | −1.6 | BLUE SPRUCE | | 3/4" | 3/8 | 18" | 1 | SAND | 40 |
| 10 | | −1.1 | MAPLE | | 3/4" | 3/8 | 18" | 1 | SAND | 40 |
| 11 | | −1.1 | MAPLE | | 3/4" | 3/8 | 18" | 1 | SAND | 40 |
| 12 | | −1.4 | BIRCH | | 3/4" | 3/8 | 18" | 1 | SAND | 40 |
| 13 | | −1.4 | BIRCH | | 3/4" | 3/8 | 36" | 1 | SAND | 40 |
| 14 | | −1.5 | BIRCH | | 3/4" | 3/8 | 2" | 1 | SAND | 40 |
| 15 | | −1.2 | OAK | | 3/4" | 3/8 | 18" | 4 | SAND | 40 |
| 16 | | −1.2 | ELM | | 3/4" | 3/8 | 18" | 1 | SAND | 40 |
| 17 | | −1.5 | APPLE | | 3/4" | 3/8 | 18" | 1 | SAND | 40 |
| 18 | | −1.5 | APPLE | | 3/4" | 3/8 | 36" | 1 | SAND | 40 |
| 19 | | −1.3 | OAK | | 3/4" | 3/8 | 18" | 1 | SAND | 40 |
| 20 | | −1.2 | MAPLE | | 3/4" | 3/8 | 18" | 1 | SAND | 40 |
| 21 | | −0.8 | ? BUSH | | 3/4" | 3/8 | 12" | 1 | SAND | 40 |
| 22 | | −1.1 | ELDER | | 3/4" | 3/8 | 18" | 1 | SAND | 40 |
| 23 | | −1.6 | SPRUCE | | 3/4" | 3/8 | 18" | 1 | SAND | 40 |
| 24 | | −1.2 | OAK | | 3/4" | 3/8 | 18" | 1 | SAND | 40 |
| 25 | | −1.1 | GREEN | | 3/4" | 3/8 | 18" | 1 | SAND | 40 |
| 26 | | −1.1 | SPRUCE | | 3/4" | 3/8 | 36" | 1 | SAND | 40 |
| 27 | | −1.1 | | | 3/4" | 3/8 | 48" | 1 | SAND | 40 |
| 28 | | −1.1 | | | 3/4" | 3/8 | 8" | 1 | SAND | 40 |
| 29 | | −1.1 | | | 3/4" | 3/8 | 2" | 1 | SAND | 40 |
| 30 | | −1.1 | | | 3/4" | 3/8 | 4" | 1 | SAND | 40 |
| 31 | | −1.0 | BIRCH | | 3/4" | 3/8 | 18" | 1 | SAND | 40 |
| 32 | | −1.0 | BIRCH | | 3/4" | 3/8 | 12" | 1 | SAND | 40 |
| 33 | | −1.0 | BIRCH | | 3/4" | 3/8 | 5" | 1 | SAND | 40 |
| 34 | | −1.1 | MAPLE | | 3/4" | 3/8 | 18" | 1 | SAND | 40 |
| 35 | | −1.4 | OAK | | 3/4" | 3/8 | 18" | 1 | SAND | 40 |
| 36 | | −0.9 | ? | | 3/4" | 3/8 | 12" | 1 | SAND | 40 |
| 37 | | 1.1 | ELM | | 3/4" | 3/8 | 18" | 1 | SAND | 40 |
| 38 | | 1.2 | ELM | | 3/4" | 1/4 to 3/8 | | 18" | 1 | SAND | APPOX 60 |
| 39 | | 1.1 | OAK | | 3/4" | 1/4 to 3/8 | | 18" | 1 | SAND | APPOX 60 |
| 40 | | 1.1 | OAK | | 3/4" | 1/4 to 3/8 | | 18" | 1 | SAND | APPOX 60 |
| 41 | | 1.2 | ELM | | 3/4" | 1/4 to 3/8 | | 18" | 1 | SAND | APPOX 60 |
| 42 | | 1.0 | BIRCH | | 3/4" | 1/4 to 3/8 | | 18" | 1 | SAND | APPOX 60 |
| 43 | | 1.2 | MAPLE | | 3/4" | 1/4 to 3/8 | | 18" | 1 | SAND | APPOX 60 |
| 44 | | 1.4 | BLUE SPRUCE | | 3/4" | 1/4 to 3/8 | | 18" | 1 | SAND | APPOX 60 |
| 45 | | 1.1 | ELM | | 3/4" | 1/4 to 3/8 | | 18" | 1 | SAND | APPOX 60 |
| 45 | | 1.3 | MAPLE | | 3/4" | 1/4 to 3/8 | | 18" | 1 | SAND | APPOX 60 |
| 47 | | 1.1 | MAPLE | | 3/4" | 1/4 to 3/8 | | 18" | 1 | SAND | APPOX 60 |
| 48 | | −1.2 | APPLE | | 3/4" | 1/4 to 3/8 | | 18" | 5 | SAND | 40 |
| 49 | | −1.2 | APPLE | | 3/4" | 1/4 to 3/8 | | 30" | 4 | SAND | 40 |
| 50 | | −1.3 | WILLOW | | 3/4" | 1/4 to 3/8 | | 18" | 1 | SAND | 40 |
| 51 | | −1.3 | WILLOW | | 3/4" | 1/4 to 3/8 | | 24" | 1 | SAND | 40 |
| 52 | | −1.3 | WILLOW | | 3/4" | 1/4 to 3/8 | | 36" | 1 | SAND | 40 |
| 53 | | −1.0 | MAPLE | | 3/4" | 1/4 to 3/8 | | 18" | 1 | SAND | 40 |
| 54 | | −1.1 | MAPLE | | 3/4" | 1/4 to 3/8 | | 0" | 1 | SAND | 40 |

APPENDIX A-continued

| | | | POWER SOURCE DATA COLLECTION | | | Height | | | |
|---|---|---|---|---|---|---|---|---|---|
| Test No. | Time Intervals | Voltage DC | Tree Type | Nail Type | Nail Penetration Depth | Nail Diameter | from Ground | No. of Nails | Soil Type | Altitude |
| 55 | | −1.2 | ELM | ¾" | ¼ to ⅜ | | 18" | 1 | SAND | 40 |
| 56 | | 1.3 | OAK | ¾" | ¼ to ⅜ | | 18" | 1 | SAND CLAY | 120 |
| 57 | | 1.1 | ELM | ¾" | ¼ to ⅜ | | 18" | 1 | SAND CLAY | 120 |
| 58 | | 1.4 | SASAFRAS | ¾" | ¼ to ⅜ | | 18" | 1 | SAND CLAY | 120 |
| 59 | | 1.0 | OAK | ¾" | ¼ to ⅜ | | 18" | 1 | SAND CLAY | 120 |
| 60 | | 1.0 | OAK | ¾" | ¼ to ⅜ | | 38" | 1 | SAND CLAY | 120 |
| 61 | | 1.2 | OAK | ¾" | ¼ to ⅜ | | 0" | 1 | SAND CLAY | 120 |
| 62 | | 1.3 | SPRUCE | ¾" | ¼ to ⅜ | | 18" | 1 | SAND CLAY | 120 |
| 63 | | 1.4 | SPRUCE | ¾" | ¼ to ⅜ | | 30" | 1 | SAND CLAY | 120 |
| 64 | | 1.2 | MAPLE | ¾" | ¼ to ⅜ | | 18" | 1 | SAND CLAY | 120 |
| 65 | | 1.1 | CEDAR | ¾" | ¼ to ⅜ | | 18" | 1 | SAND | 40 |
| 66 | | 1.4 | CHERRY | ¾" | ¼ to ⅜ | | 18" | 1 | SAND | 40 |
| 67 | | 1.4 | CHERRY | ¾" | ¼ to ⅜ | | 12" | 1 | SAND | 40 |
| 68 | | 1.5 | CHERRY | ¾" | ¼ to ⅜ | | 0" | 1 | SAND | 40 |
| 69 | | 1.4 | CHERRY | ¾" | ¼ to ⅜ | | 36" | 1 | SAND | 40 |
| 70 | | 1.1 | CEDAR | ¾" | ¼ to ⅜ | | 18" | 1 | SAND | 40 |
| 71 | | 1.2 | MAPLE | ¾" | ¼ to ⅜ | | 18" | 1 | SAND | 40 |
| 72 | | 1.2 | MAPLE | ¾" | ¼ to ⅜ | | 36" | 1 | SAND | 40 |
| 73 | | 1.3 | MAPLE | ¾" | ¼ to ⅜ | | 0" | 1 | SAND | 40 |
| 112 | | 0.9 | CEDAR | ¾" | ¼ to ⅜ | | 18" | 1 | SAND | 40' |
| 113 | | 0.9 | CEDAR | ¾" | ¼ to ⅜ | | 36" | 1 | SAND | 40' |
| 114 | | 1.0 | CEDAR | ¾" | ¼ to ⅜ | | 0" | 1 | SAND | 40' |
| 115 | | 1.0 | CEDAR | ¾" | ¼ to ⅜ | | 0" | 1 | SAND | 40' |
| 116 | | 1.3 | OAK | ¾" | ¼ to ⅜ | | 18" | 1 | SAND | 200' |
| 117 | | 1.3 | OAK | ¾" | ¼ to ⅜ | | 24" | 1 | SAND | 200' |
| 118 | | 1.3 | OAK | ¾" | ¼ to ⅜ | | 48" | 1 | SAND | 200' |
| 119 | | 1.3 | OAK | ¾" | ¼ to ⅜ | | 0" | 1 | SAND | 200' |
| 120 | | 1.1 | MAPLE | ¾" | ¼ to ⅜ | | 18" | 1 | SAND | 200' |
| 121 | | 1.1 | MAPLE | ¾" | ¼ to ⅜ | | 24" | 1 | SAND | 200' |
| 122 | | 1.2 | MAPLE | ¾" | ¼ to ⅜ | | 0" | 1 | SAND | 200' |
| 123 | | 1.4 | SPRUCE | ¾" | ¼ to ⅜ | | 18" | 1 | SAND | 200' |
| 124 | | 1.5 | SPRUCE | ¾" | ¼ to ⅜ | | 0" | 1 | SAND | 200' |
| 125 | | 1.2 | OAK | ¾" | ¼ to ⅜ | | 18" | 1 | SAND | 200' |
| 126 | | 1.2 | OAK | ¾" | ¼ to ⅜ | | 24" | 1 | SAND | 200' |
| 127 | | 1.3 | OAK | ¾" | ¼ to ⅜ | | 0" | 1 | SAND | 200' |
| 128 | | 1.0 | MAPLE | ¾" | ¼ to ⅜ | | 18" | 1 | SAND | 200' |
| 129 | | 1.0 | MAPLE | ¾" | ¼ to ⅜ | | 24" | 1 | SAND | 200' |
| 130 | | 1.0 | MAPLE | ¾" | ¼ to ⅜ | | 36" | 1 | SAND | 200' |
| 131 | | 1.1 | MAPLE | ¾" | ¼ to ⅜ | | 0" | 1 | SAND | 200' |
| 132 | | −1.2 | MAPLE | ¾" | ¼ to ⅜ | | 24" | 1 | SAND | 200' |
| 133 | | −1.2 | MAPLE | ¾" | ¼ to ⅜ | | 24" | 4 | SAND | 200' |
| 134 | | −1.2 | ELM | ¾" | ¼ to ⅜ | | 18" | 1 | SAND | 200' |
| 135 | | −1.2 | ELM | ¾" | ¼ to ⅜ | | 30" | 1 | SAND | 200' |
| 136 | | −1.3 | ELM | ¾" | ¼ to ⅜ | | 44" | 8 | SAND | 200' |
| 137 | | −1.2 | ELM | ¾" | ¼ to ⅜ | | 60" | 1 | SAND | 200' |
| 138 | | −1.4 | SPRUCE | ¾" | ¼ to ⅜ | | 8" | 1 | SAND | 200' |
| 139 | | 1.2 | ELM | ¾" | ¼ to ⅜ | | 20" | 1 | SAND | 140' |
| 140 | | 1.2 | ELM | ¾" | ¼ to ⅜ | | 28" | 1 | SAND | 140' |
| 141 | | 1.2 | ELM | ¾" | ¼ to ⅜ | | 36" | 1 | SAND | 140' |
| 142 | | 1.4 | ELM | ¾" | ¼ to ⅜ | | 0" | 1 | SAND | 140' |
| 143 | | 1.6 | SPRUCE | ¾" | ¼ to ⅜ | | 18" | 1 | SAND | 140' |
| 144 | | 1.6 | SPRUCE | ¾" | ¼ to ⅜ | | 30" | 1 | SAND | 140' |
| 145 | | 1.4 | SPRUCE | ¾" | ¼ to ⅜ | | 0" | 1 | SAND | 140' |
| 146 | | 1.1 | MAPLE | ¾" | ¼ to ⅜ | | 18" | 1 | SAND | 140' |
| 147 | | 1.1 | MAPLE | ¾" | ¼ to ⅜ | | 24" | 1 | SAND | 140' |
| 148 | | 1.1 | MAPLE | ¾" | ¼ to ⅜ | | 46" | 1 | SAND | 140' |
| 149 | | 1.3 | MAPLE | ¾" | ¼ to ⅜ | | 0" | 1 | SAND | 140' |
| 150 | | 1.1 | OAK | ¾ | ¼-⅜ | | 18" | | SAND | 140' |
| 151 | | 1.1 | OAK | ¾ | ¼-⅜ | | 28" | | SAND CLAY | 140' |
| 152 | | 1.1 | OAK | ¾ | ¼-⅜ | | 38" | | SAND CLAY | 140' |
| 153 | | 1.2 | OAK | ¾ | ¼-⅜ | | 49" | | SAND CLAY | 140' |
| 154 | | 1.2 | OAK | ¾ | ¼-⅜ | | 0" | | SAND CLAY | 140' |
| 155 | | 0.9 | RED OAK | ¾ | ¼-⅜ | | 18" | 1 | SAND CLAY | 140' |
| 156 | | 0.9 | RED OAK | ¾ | ¼-⅜ | | 30" | 1 | SAND CLAY | 140' |
| 157 | | 0.8 | RED OAK | ¾ | ¼-⅜ | | 56" | 1 | SAND CLAY | 140' |
| 158 | | 1.1 | RED OAK | ¾ | ¼-⅜ | | 0" | 1 | SAND CLAY | 140' |
| 159 | | 1.2 | SUGAR MAPLE | ¾ | ¼-⅜ | | 18" | 1 | SAND CLAY | 140' |
| 160 | | 1.2 | SUGAR MAPLE | ¾ | ¼-⅜ | | 25" | 1 | SAND CLAY | 140' |
| 161 | | 1.3 | SUGAR MAPLE | ¾ | ¼-⅜ | | 0" | 1 | SAND CLAY | 140' |
| 162 | | 1.4 | SUGAR MAPLE | ¾ | ¼-⅜ | | 18" | 1 | SAND CLAY | 140' |
| 163 | | 1.2 | BLACK CHERRY | ¾ | ¼-⅜ | | 17" | 1 | SAND CLAY | 140' |
| 164 | | 1.2 | BLACK CHERRY | ¾ | ¼-⅜ | | 25" | 1 | SAND CLAY | 140' |
| 165 | | 1.3 | BLACK CHERRY | ¾ | ¼-⅜ | | 0" | 1 | SAND CLAY | 140' |

APPENDIX A-continued

| | | | | POWER SOURCE DATA COLLECTION | | Height | | | |
|---|---|---|---|---|---|---|---|---|---|
| Test No. | Time Intervals | Voltage DC | Tree Type | Nail Type | Nail Penetration Depth | Nail Diameter | from Ground | No. of Nails | Soil Type | Altitude |
| 166 | | 1.4 | BLACK CHERRY | ¾ | | ¼-⅜ | 20" | 12 | SAND CLAY | 140' |
| 167 | | 1.4 | PEAR | ¾ | | ¼-⅜ | 0" | 1 | SAND CLAY | 140' |
| 168 | | 1.1 | PEAR | ¾ | | ¼-⅜ | 18" | 1 | SAND CLAY | 140' |
| 169 | | 1.1 | WILLOW | ¾ | | ¼-⅜ | 27" | 1 | SAND CLAY | 140' |
| 170 | | 1.3 | WILLOW | ¾ | | ¼-⅜ | 0" | 1 | SAND CLAY | 140' |
| 171 | | 1.6 | WILLOW | ¾ | | ¼-⅜ | 18" | 1 | SAND CLAY | 140' |
| 172 | | 1.1 | SPRUCE | ¾ | | ¼-⅜ | 20" | 1 | SAND CLAY | 140' |
| 173 | | 1.1 | BEECH | ¾ | | ¼-⅜ | 30" | 1 | SAND | 40' |
| 174 | | 1.1 | BEECH | ¾ | | ¼-⅜ | 40" | 1 | SAND | 40' |
| 175 | | 1.1 | BEECH | ¾ | | ¼-⅜ | 50" | 1 | SAND | 40' |
| 176 | | 1.0 | BEECH | 3 inch | | ¼-⅜ | 20" | 1 | SAND | 40' |
| 177 | | 1.0 | BEECH | 5 inch | | ¼-⅜ | 20" | 1 | SAND | 40' |
| 178 | | 1.2 | BEECH | staple | | ¼-⅜ | 20" | 1 | SAND | 40' |
| 179 | | 1.0 | ELM | ¾ | | ¼-⅜ | 18" | 1 | SAND | 40' |
| 180 | | 1.0 | ELM | 3 inch | | ¼-⅜ | 36" | 1 | SAND | 40' |
| 181 | | 0.9 | ELM | 5 inch | | ¼-⅜ | 36" | 1 | SAND | 40' |
| 182 | | 1.2 | ELM | staple | | ¼-⅜ | 36" | 1 | SAND | 40' |
| 183 | | 1.1 | BIRCH | ¾ | | ¼-⅜ | 18" | 1 | SAND | 40' |
| 184 | | 1.3 | ELM | ¾ | | ¼-⅜ | 18" | 1 | SAND | 140' |
| 185 | | 1.3 | ELM | ¾ | | ¼-⅜ | 36" | 1 | SAND | 140' |
| 186 | | 1.4 | ELM | ¾ | | ¼-⅜ | 0" | 1 | SAND | 140' |
| 187 | | 1.4 | SPRUCE | ¾" | | ¼ to ⅜ | 18" | 1 | SAND | 140 |
| 188 | | 1.4 | SPRUCE | ¾" | | ¼ to ⅜ | 34" | 1 | SAND | 140 |
| 189 | | 1.5 | SPRUCE | ¾" | | ¼ to ⅜ | 0 | 1 | SAND | 140 |
| 190 | | 1.3 | OAK | ¾" | | ¼ to ⅜ | 18" | 1 | SAND | 140 |
| 191 | | 1.3 | OAK | ¾" | | ¼ to ⅜ | 36" | 1 | SAND | 140 |
| 192 | | 1.3 | OAK | ¾" | | ¼ to ⅜ | 48" | 1 | SAND | 140 |
| 193 | | 1.4 | OAK | ¾" | | ¼ to ⅜ | 0 | 1 | SAND | 140 |
| 194 | | 1.3 | APPLE? | ¾" | | ¼ to ⅜ | 18" | 1 | SAND | 140 |
| 195 | | 1.3 | APPLE | ¾" | | ¼ to ⅜ | 30" | 1 | SAND | 140 |
| 196 | | 1.1 | PINE | ¾" | | ¼ to ⅜ | 18" | 1 | SAND | 140 |
| 197 | | 1.1 | PINE | ¾" | | ¼ to ⅜ | 36" | 1 | SAND | 140 |
| 198 | | 1.0 | MAPLE | ¾" | | ¼ to ⅜ | 18" | 1 | SAND | 40 |
| 199 | | 1.0 | MAPLE | ¾" | | ¼ to ⅜ | 36" | 1 | SAND | 40 |
| 200 | | 1.2 | BLACK CHERRY | ¾" | | ¼ to ⅜ | 12" | 1 | SAND | 40 |
| 201 | | 1.2 | BLACK CHERRY | ¾" | | ¼ to ⅜ | 20" | 1 | SAND | 40 |
| 202 | | 1.2 | BLACK CHERRY | ¾" | | ¼ to ⅜ | 48" | 1 | SAND | 40 |
| 203 | | 1.3 | BLACK CHERRY | ¾" | | ¼ to ⅜ | 0 | 1 | SAND | 40 |
| 204 | | 1.1 | LILAC | ¾" | | ¼ to ⅜ | 14" | 1 | SAND | 40 |
| 205 | | 1.1 | LILAC | ¾" | | ¼ to ⅜ | 22" | 1 | SAND | 40 |
| 206 | | 1.1 | LILAC | ¾" | | ¼ to ⅜ | 40" | 1 | SAND | 40 |
| 207 | | 1.1 | ELM | ¾" | | ¼ to ⅜ | 18" | 1 | SAND | 40 |
| 208 | | 1.1 | ELM | ¾" | | ¼ to ⅜ | 36" | 1 | SAND | 40 |
| 209 | | 1.1 | ELM | ¾" | | ¼ to ⅜ | 50" | 1 | SAND | 40 |
| 210 | | 1.3 | SPRUCE | ¾" | | ¼ to ⅜ | 18" | 1 | SAND | 40 |
| 211 | | 1.3 | SPRUCE | ¾" | | ¼ to ⅜ | 30" | 1 | SAND | 40 |
| 212 | | 1.3 | SPRUCE | ¾" | | ¼ to ⅜ | 50" | 1 | SAND | 40 |
| 213 | | 1.3 | SPRUCE | ¾" | | ¼ to ⅜ | 74" | 1 | SAND | 40 |
| 214 | | −1.2 | ELM | ¾" | | ¼ to ⅜ | 20" | 8 | SAND | 40 |
| 215 | | −1.2 | ELM | ¾" | | ¼ to ⅜ | 36" | 1 | SAND | 40 |
| 216 | | −1.3 | ELM | ¾" | | ¼ to ⅜ | 0 | 1 | SAND | 40 |
| 217 | | −1.1 | MAPLE | ¾" | | ¼ to ⅜ | 18" | 1 | SAND | 40 |
| 218 | | −1.3 | APPLE | ¾" | | ¼ to ⅜ | 14" | 1 | SAND | 40 |
| 219 | | −1.3 | APPLE | ¾" | | ¼ to ⅜ | 25" | 1 | SAND | 40 |
| 220 | | −1.3 | APPLE | ¾" | | ¼ to ⅜ | 50" | 1 | SAND | 40 |
| 221 | | −1.4 | SPRUCE | ¾" | | ¼ to ⅜ | 14" | 1 | SAND | 40 |
| 222 | | −1.4 | SPRUCE | ¾" | | ¼ to ⅜ | 22" | 1 | SAND | 40 |
| 223 | | −1.4 | SPRUCE | ¾" | | ¼ to ⅜ | 36" | 1 | SAND | 40 |
| 224 | | −1.1 | MAPLE | ¾" | | ¼ to ⅜ | 18" | 1 | SAND | 40 |
| 225 | | −1.1 | MAPLE | ¾" | | ¼ to ⅜ | 36" | 1 | SAND | 40 |
| 226 | | −1.0 | ELM | ¾" | | ¼ to ⅜ | 20" | 1 | SAND | 40 |
| 227 | | −1.0 | ELM | ¾" | | ¼ to ⅜ | 40" | 1 | SAND | 40 |
| 228 | | −1.0 | ELM | ¾" | | ¼ to ⅜ | 50" | 1 | SAND | 40 |
| 229 | | −1.2 | BEECH | ¾" | | ¼ to ⅜ | 18" | 1 | SAND | 40 |
| 230 | | −1.2 | BEECH | ¾" | | ¼ to ⅜ | 24" | 1 | SAND | 40 |
| 231 | | −1.2 | BEECH | ¾" | | ¼ to ⅜ | 38" | 1 | SAND | 40 |
| 232 | | −1.3 | OAK | ¾" | | ¼ to ⅜ | 16" | 1 | SAND | 40 |
| 233 | | −1.3 | OAK | ¾" | | ¼ to ⅜ | 28" | 1 | SAND | 40 |
| 234 | | −1.3 | OAK | ¾" | | ¼ to ⅜ | 38" | 1 | SAND | 40 |
| 235 | | −1.4 | OAK | ¾" | | ¼ to ⅜ | 0 | 1 | SAND | 40 |
| 236 | | −1.2 | BIRCH | ¾" | | ¼ to ⅜ | 18" | 1 | SAND | 40 |
| 237 | | −1.3 | BIRCH | ¾" | | ¼ to ⅜ | 30" | 1 | SAND | 40 |
| 238 | | −1.3 | BIRCH | ¾" | | ¼ to ⅜ | 44" | 1 | SAND | 40 |

APPENDIX A-continued

| Test No. | Time Intervals | Voltage DC | Tree Type | Nail Type | Nail Penetration Depth | Nail Diameter | Height from Ground | No. of Nails | Soil Type | Altitude |
|---|---|---|---|---|---|---|---|---|---|---|
| 239 | | −1.2 | BIRCH | ¾" | ¼ to ⅜ | | 0 | 1 | SAND | 40 |
| 240 | | −1.1 | POPLAR | ¾" | ¼ to ⅜ | | 18" | 1 | SAND | 40 |
| 241 | | −1.1 | POPLAR | ¾" | ¼ to ⅜ | | 24" | 1 | SAND | 40 |
| 242 | | −1.2 | POPLAR | ¾" | ¼ to ⅜ | | 36" | 1 | SAND | 40 |
| 243 | | −1.2 | POPLAR | ¾" | ¼ to ⅜ | | 48" | 1 | SAND | 40 |
| 244 | | −1.1 | ELM | ¾" | ¼ to ⅜ | | 18" | 1 | SAND | 40 |
| 245 | | −1.1 | ELM | ¾" | ¼ to ⅜ | | 28" | 1 | SAND | 40 |
| 246 | | −1.2 | BLACKBERRY | ¾" | ¼ to ⅜ | | ?10"? | 1 | SAND | 40 |
| 247 | | −1.2 | BLACKBERRY | ¾" | ¼ to ⅜ | | 16" | 1 | SAND | 40 |
| 248 | | −0.9 | WILLOW | ¾" | ¼ to ⅜ | | 12" | 1 | SAND | 40 |
| 249 | | −1.0 | WILLOW | ¾" | ¼ to ⅜ | | 20" | 1 | SAND | 40 |
| 250 | | −1.1 | WILLOW | ¾" | ¼ to ⅜ | | 0 | 1 | SAND | 40 |
| 251 | | −0.8 | BROCOLLI | ¾" | ¼ to ⅜ | | 8" | 1 | SAND | 40 |
| 252 | | −0.7 | BROCOLLI | ¾" | ¼ to ⅜ | | LEAF | 1 | SAND | 40 |
| 253 | | −1.1 | ELM | ¾" | ¼ to ⅜ | | 14" | 1 | SAND | 40 |
| 254 | | −1.1 | ELM | ¾" | ¼ t0 ⅜ | | 20" | 1 | SAND | 40 |
| 255 | | −1.0 | ELM | ¾" | ¼ to ⅜ | | 18" | 1 | SAND | 40 |
| 256 | | −1.0 | ELM | ¾" | ¼ to ⅜ | | 36" | 1 | SAND | 40 |
| 257 | | −1.1 | WALNUT | ¾" | ¼ to ⅜ | | 18" | 1 | SAND | 40 |
| 258 | | −0.3 | WALNUT | ¾" | ¼ to ⅜ | | 18" | 1 | SAND | 40 |
| 259 | | −0.4 | PINE | ¾" | ¼ to ⅜ | | 16" | 1 | SAND | 40 |
| 260 | | −0.9 | PINE | ¾" | ¼ to ⅜ | | 0 | 1 | SAND | 40 |
| 261 | | −1.2 | PINE | ¾" | ¼ to ⅜ | | 20" | 1 | SAND | 40 |
| 262 | | −1.2 | PINE | ¾" | ¼ to ⅜ | | 40" | 1 | SAND | 40 |
| 263 | | −1.3 | PINE | ¾" | ¼ to ⅜ | | 0 | 1 | SAND | 40 |
| 264 | | −1.1 | LILAC | ¾" | ¼ to ⅜ | | 12" | 1 | SAND | 40 |
| 265 | | −1.1 | LILAC | ¾" | ¼ to ⅜ | | 18" | 1 | SAND | 40 |
| 266 | | −1.0 | MAPLE | ¾" | ¼ to ⅜ | | 2" | 1 | SAND | 40 |
| 267 | | −1.0 | MAPLE | ¾" | ¼ to ⅜ | | 0 | 1 | SAND | 40 |
| 268 | | −1.1 | PINE | ¾" | ¼ to ⅜ | | 18" | 1 | SAND | 40 |
| 269 | | −1.0 | PINE | ¾" | ¼ to ⅜ | | 32" | 1 | SAND | 40 |
| 270 | | −1.3 | LEMON | ¾" | ¼ to ⅜ | | 18" | 1 | SAND | 40 |
| 271 | | −0.9 | TOMATO | ¾" | ¼ to ⅜ | | 6" | 1 | SAND | 40 |
| 272 | | −0.8 | CAULIFLOWER | ¾" | ¼ to ⅜ | | 2" | 1 | SAND | 40 |
| 273 | | 0.0 | GRASS | ¾" | ¼ to ⅜ | | 0 | Alligator clip | SAND | 40 |
| 274 | | −1.1 | PINE | ¾" | ¼ to ⅜ | | 16" | 1 | SAND | 40 |
| 275 | | −1.1 | MAPLE | ¾" | ¼ to ⅜ | | 15" | 1 | SAND | 40 |
| 276 | | −1.1 | MAPLE | ¾" | ¼ to ⅜ | | 28" | 1 | SAND | 40 |
| 277 | | −1.0 | MAPLE | ¾" | ¼ to ⅜ | | 36" | 1 | SAND | 40 |
| 278 | | −1.0 | ELM | ¾" | ¼ to ⅜ | | 25" | 1 | SAND | 40 |
| 279 | | −1.1 | ELM | ¾" | ¼ to ⅜ | | 35" | 1 | SAND | 40 |
| 280 | | −0.9 | MAPLE | ¾" | ¼ to ⅜ | | 18" | 1 | SAND | 40 |
| 281 | | −1.0 | MAPLE | ¾" | ¼ to ⅜ | | 36" | 1 | SAND | 40 |
| 282 | | −1.0 | CEDAR | ¾" | ¼ to ⅜ | | 18" | 1 | SAND | 40 |
| 283 | | −1.1 | CEDAR | ¾" | ¼ to ⅜ | | 30" | 1 | SAND | 40 |
| 284 | | −1.0 | BASSWOOD | ¾" | ¼ to ⅜ | | 20" | 1 | SAND | 40 |
| 285 | | −1.0 | BASSWOOD | ¾" | ¼ to ⅜ | | 36" | 1 | SAND | 40 |
| 286 | | −1.0 | BASSWOOD | ¾" | ¼ to ⅜ | | 48" | 1 | SAND | 40 |
| 287 | | −1.0 | BASSWOOD | ¾" | ¼ to ⅜ | | 65" | 1 | SAND | 40 |
| 290 | | 0.0 | TELE POLE | ¾" | ¼ to ⅜ | | 24" | 1 | SAND | 40 |
| 291 | | −0.9 | LILAC | ¾" | ¼ to ⅜ | | 16" | 1 | SAND | 40 |
| 293 | | −1.4 | SPRUCE | ¾" | ¼ to ⅜ | | 18" | 1 | SAND | 40 |
| 294 | | −1.4 | SPRUCE | ¾" | ¼ to ⅜ | | 28" | 1 | SAND | 40 |
| 295 | | −1.3 | SPRUCE | ¾" | ¼ to ⅜ | | 40" | 1 | SAND | 40 |
| 296 | | −1.1 | ELM | ¾" | ¼ to ⅜ | | 16" | 1 | SAND | 40 |
| 297 | | −1.2 | APPLE | ¾" | ¼ to ⅜ | | 16" | 1 | SAND | 40 |
| 298 | | −1.2 | APPLE | ¾" | ¼ to ⅜ | | 24" | 1 | SAND | 40 |
| 299 | | −1.1 | MAPLE | ¾" | ¼ to ⅜ | | 18" | 1 | SAND | 40 |
| 300 | | −1.1 | MAPLE | ¾" | ¼ to ⅜ | | 30" | 1 | SAND | 40 |
| 301 | | −1.2 | MAPLE | ¾" | ¼ to ⅜ | | 0 | 1 | SAND | 40 |
| 302 | | −1.2 | APPLE | ¾" | ¼ to ⅜ | | 16" | 1 | SAND | 40 |
| 303 | | −1.2 | APPLE BROCCOLI | ¾" | ¼ to ⅜ | | | 1 | SAND | 40 |
| 304 | | −1.2 | APPLE BROCCOLI | ¾" | ¼ to ⅜ | | | 1 | SAND | 40 |
| 305 | | −1.2 | APPLE BROCCOLI | ¾" | ¼ to ⅜ | | | 1 | SAND | 40 |

| No. of taps | Material | No. of ground rods | Ground material | DC Voltage | AC Voltage | Current (mA) |
|---|---|---|---|---|---|---|
| 1 | Roofing Nail | 1 | Copper | 1.02 | 1.20 | 15 |
| 1 | Roofing Nail | 2 | Copper | 1.02 | 1.20 | 21 |
| 1 | Roofing Nail | 3 | Copper | 1.02 | 1.20 | 28 |
| 1 | Roofing Nail | 6 | Copper | 1.00 | 1.20 | 45 |
| 2 | Roofing Nail | 1 | Copper | 1.02 | 1.20 | 20 |
| 2 | Roofing Nail | 2 | Copper | 1.00 | 1.20 | 27 |
| 2 | Roofing Nail | 3 | Copper | 1.00 | 1.20 | 35 |
| 2 | Roofing Nail | 6 | Copper | 1.01 | 1.20 | 57 |

| Conductor 1 | Media | Conductor 2 | Media | DC Voltage | AC Voltage | Current (mADC) |
|---|---|---|---|---|---|---|
| Copper | Tree | Copper | Earth | 0.50 | 0.60 | 10 |
| Copper | Tree | Copper | Tree | 0.01 | 0.00 | 0.00 |
| Roofing Nail | Tree | Copper | Earth | 0.72 | 0.80 | 30 |
| Roofing Nail | Tree | Copper | Tree | 0.85 | 0.00 | 20 |
| Roofing Nail | Tree | Roofing Nail | Tree | 0.02 | 0.00 | 0.00 |
| Roofing Nail | Tree | Roofing Nail | Earth | 0.46 | 0.50 | 1.0 |

| Conductor 1 | Media | Conductor 2 | Media | DC Voltage | AC Voltage | Current (μADC) | Elevation |
|---|---|---|---|---|---|---|---|
| Roofing Nail | Potted Tree | Copper | Earth | 0.60 | 0.20 | 22 | Ground level |
| Roofing Nail | Potted Tree | Copper | Earth | 0.60 | 0.20 | 21 | 1" thick pine board |
| Roofing Nail | Potted Tree | Copper | Earth | 0.59 | 0.59 | 21 | 16" wooden box |
| Roofing Nail | Potted Tree | Copper | Earth | 0.00 | 0.00 | 0.00 | Held waist high |

The potted tree was a Norfolk Island Pine approximately three feet tall, which was potted in a plastic pot about 40 mils. thick.

APPENDIX B

Test 1:

| Time | Storm distance | DC Voltage from tree |
|---|---|---|
| Baseline Voltage | — | 1.2 V |
| 11:00 AM | About 100 miles | 1.1 V |
| 12:00 PM | About 50-60 miles | 1.0 V |
|  |  | 0.5 V |
|  |  | 1.0 V |
|  |  | 0.5 V |
| 2:00 PM | Dissipated | 1.2 V |

The 12:00 PM measurements reflect fluctuations when lightning strikes occurred.

Test 2:

| Time | Storm distance | DC Voltage from tree |
|---|---|---|
| Baseline Voltage | — | 1.2 V |
| 3:00 PM | 50-60 miles | 1.1 V |
| 3:15 PM | 40-50 miles | 1.0 V |
|  |  | 0.3 V |
|  |  | 1.0 V |
|  |  | 0.3 V |
| 3:30 PM | Dissipated | 1.2 V |

The 3:15 PM measurements reflect fluctuations when lightning strikes occurred.

Test 3:

| Time | Storm distance | DC Voltage from tree |
|---|---|---|
| Baseline Voltage | — | 1.1 V |
| 7:45 PM | 50-60 miles | 1.1 V |
| 7:55 PM | 40-50 miles | 0.72 V |
|  |  | 0.85 V |
|  |  | 0.72 V |
| 9:16 PM | Dissipated | 1.1 V |

The 7:55 PM measurements reflect fluctuations when lightning strikes occurred.

The invention claimed is:

1. A method for drawing electricity from a non-animal organism,
the method comprising: coupling a first electrical conductor to the non-animal organism;
coupling a second electrical conductor to a ground rod; embedding the ground rod into soil at a predetermined depth as a function of a desired current level, whereby the current available from the non-animal organism is increased by increasing at least one of the depth that the ground rod is embedded into the soil and the quantity of ground rods; coupling an electrical load between the first electrical conductor and the second electrical conductor, the electrical load being configured to draw electricity from the non-animal organism via the first electrical conductor; and operating the electrical load using electricity drawn from the non-animal organism.

2. A method according to claim 1, wherein the load is a voltmeter coupled between the first electrical conductor and the second electrical conductor; and further including measuring with the voltmeter a voltage between the first and second electrical conductors and providing a weather prediction as a function of the measured voltage potential.

3. The method of claim 2 further comprising: determining a baseline voltage reading for the non-animal organism under a first weather condition; determining a plurality of voltage readings over time; comparing each of the plurality of voltage readings to the baseline voltage reading to determine differences between the baseline voltage reading and each of the plurality of voltage readings; and calculating information indicative of a second, future weather condition as a function of the differences.

4. A system comprising: a non-animal organism; a first electrical conductor electrically coupled to the non-animal organism; a plurality of ground rods embedded into soil; a second electrical conductor coupled to the plurality of ground rods; and an electrical load coupled between the first electrical conductor and the second electrical conductor to draw electricity from the non-animal organism, the electrical load using electricity drawn from the non-animal organism.

5. The system of claim 4 wherein the load is live vegetative matter growing in soil and wherein the growth of the live vegetative matter is stimulated by the electricity provided by the non-animal organism.

6. The system of claim 4 wherein the load is selected from the group consisting of: a battery; a battery charging circuit; a sensor; a radio frequency identification chip; a transmitter; a receiver; a global positioning service (GPS) device; a light emitting device; a fire ignition system; an oxygen sensor; an air-speed sensor; a humidity sensor; a barometric pressure sensor; a camera; a photoelectric sensor; a altitude sensor; a smoke detector; a microphone; and a vibration sensor.

7. The system of claim 6 wherein the load is the GPS device and the GPS device is selected from the group consisting of: a GPS receiver; a GPS transmitter; a GPS guidance system; and a GPS navigation system.

8. The system of claim 6 wherein the load is the light emitting device and the light emitting device is selected from the group consisting of: a light emitting diode configured to emit visible light; and an infrared light emitting diode configured to emit an infrared signal.

* * * * *